(12) United States Patent
Okuda et al.

(10) Patent No.: US 11,418,658 B2
(45) Date of Patent: Aug. 16, 2022

(54) IMAGE PROCESSING APPARATUS, IMAGE PROCESSING SYSTEM, IMAGE PROCESSING METHOD, AND STORAGE MEDIUM

(71) Applicant: CANON KABUSHIKI KAISHA, Tokyo (JP)

(72) Inventors: Takuhiro Okuda, Tokyo (JP); Katsuyuki Takahashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 157 days.

(21) Appl. No.: 17/014,190

(22) Filed: Sep. 8, 2020

(65) Prior Publication Data

US 2021/0075919 A1 Mar. 11, 2021

(30) Foreign Application Priority Data

Sep. 10, 2019 (JP) .............................. JP2019-164605

(51) Int. Cl.
*H04N 1/00* (2006.01)
*G06V 30/148* (2022.01)
(Continued)

(52) U.S. Cl.
CPC ....... *H04N 1/00331* (2013.01); *G06V 30/153* (2022.01); *G06V 30/413* (2022.01);
(Continued)

(58) Field of Classification Search
CPC ........... H04N 1/00331; H04N 1/00782; G06V 30/10; G06V 30/153; G06V 30/413; G06V 30/414
See application file for complete search history.

(56) References Cited

U.S. PATENT DOCUMENTS

| 7,469,063 | B2 | 12/2008 | Koyama |
| 2013/0188887 | A1* | 7/2013 | Chan ....................... G06T 13/00 382/312 |

FOREIGN PATENT DOCUMENTS

JP 2006092346 A 4/2006

OTHER PUBLICATIONS

Dokoku (Computer English Translation of Japanese Patent No. JP 2012-190357 A), pp. 1-21. (Year: 2012).*
(Continued)

*Primary Examiner* — Daniel G Mariam
(74) *Attorney, Agent, or Firm* — Rossi, Kimms & McDowell LLP

(57) ABSTRACT

An image forming apparatus including: a character information area display unit configured to highlight and display at least one character information area including a handwritten character string out of character information areas; an input receiving unit configured to receive a character information area including a handwritten character string specified a user; a character information area display selecting unit configured to select at least one character information area other than the character information area including the handwritten character string specified by the user to be combined with the character information area including the handwritten character string specified by the user; and a character information combining unit configured to combine character information in the character information area including the handwritten character string specified by the user and character information in the character information area selected by the character information area display selecting unit.

17 Claims, 19 Drawing Sheets

(51) Int. Cl.
*G06V 30/413* (2022.01)
*G06V 30/414* (2022.01)
*G06V 30/10* (2022.01)

(52) U.S. Cl.
CPC ....... *G06V 30/414* (2022.01); *H04N 1/00782* (2013.01); *G06V 30/10* (2022.01)

(56) References Cited

OTHER PUBLICATIONS

Takahashi, et al. (Computer English Translation of Japanese Patent No. JP 2014-235694 A), pp. 1-10. (Year: 2014).*

* cited by examiner

| APPLICATION FOR MEMBERSHIP ||
|---|---|
| MEMBERSHIP NUMBER | A 8 5 2 4 0 |
| NAME | Kazuha Masui |
| DATE OF BIRTH | 4 / 10 / 1980 |
| ADDRESS | 4-14 Mito (City)/Town Ibaraki State/(Prefecture) |

| APPLICATION FOR MEMBERSHIP ||
|---|---|
| MEMBERSHIP NUMBER | A 0 |
| NAME | |
| DATE OF BIRTH | / / |
| ADDRESS | City/Town State/Prefecture |

MEMBERSHIP NUMBER, NAME, DATE OF BIRTH, ADDRESS

| NUMBER | COORDINATES | | SIZE | | CLASSIFICATION | OCR RESULT |
|---|---|---|---|---|---|---|
| 0 | 984 | 102 | 960 | 177 | PRINTED CHARACTER | APPLICATION FOR MEMBERSHIP |
| 1 | 219 | 492 | 378 | 102 | PRINTED CHARACTER | MEMBERSHIP NUMBER |
| 2 | 741 | 429 | 204 | 219 | PRINTED CHARACTER | A |
| 3 | 2517 | 432 | 135 | 216 | PRINTED CHARACTER | 0 |
| 4 | 306 | 843 | 198 | 96 | PRINTED CHARACTER | NAME |
| 5 | 219 | 1186 | 387 | 102 | PRINTED CHARACTER | DATE OF BIRTH |
| 6 | 1359 | 1194 | 111 | 102 | PRINTED CHARACTER | / |
| 7 | 1878 | 1191 | 84 | 114 | PRINTED CHARACTER | / |
| 8 | 321 | 1536 | 198 | 102 | PRINTED CHARACTER | ADDRESS |
| 9 | 1164 | 465 | 1098 | 186 | HANDWRITTEN CHARACTER | 8524 |
| 10 | 1137 | 774 | 990 | 270 | HANDWRITTEN CHARACTER | Kazuha Masui |
| 11 | 891 | 1152 | 357 | 189 | HANDWRITTEN CHARACTER | 4 |
| 12 | 1620 | 1140 | 111 | 192 | HANDWRITTEN CHARACTER | 10 |
| 13 | 2154 | 1176 | 159 | 144 | HANDWRITTEN CHARACTER | 1980 |
| 14 | 714 | 1497 | 279 | 168 | HANDWRITTEN CHARACTER | 4-14 |
| 15 | 1290 | 1500 | 237 | 183 | HANDWRITTEN MARK | City |
| 16 | 1842 | 1494 | 813 | 177 | HANDWRITTEN MARK | Prefecture |
| 17 | 1029 | 1521 | 198 | 168 | HANDWRITTEN CHARACTER | Mito |
| 18 | 1569 | 1506 | 204 | 171 | HANDWRITTEN CHARACTER | Ibaraki |

MEMBERSHIP NUMBER, NAME, DATE OF BIRTH, ADDRESS ← 1401
A85240, Kazuha Masui, 4/10/1980, 4-14 Mito City Ibaraki Prefecture ← 1402

IMAGE PROCESSING APPARATUS, IMAGE PROCESSING SYSTEM, IMAGE PROCESSING METHOD, AND STORAGE MEDIUM

BACKGROUND OF THE INVENTION

Field of the Invention

The present disclosure relates to a technique for extracting character information from image data obtained by scanning a document.

Description of the Related Art

There is a technique in which an OCR (Optical Character Recognition) process is performed to image data obtained by scanning a document, so as to extract a character string, which is included in the image represented by the image data, as digital data. Furthermore, there is a case in which an OCR process is performed to image data obtained by scanning a document that is a printed form filled in by handwriting. In this case, since both print characters and handwritten characters exist in the document, the accuracy of character recognition may deteriorate in a case of extracting character strings of both printed characters and handwritten characters.

Japanese Patent Laid-Open No. 2006-92346 discloses a technique for improving the accuracy of character recognition by separating the areas of a printed character and a handwritten character and performing OCR processes that are suitable for the printed character and the handwritten character, respectively.

In such a form filled in by handwriting, a combination of both a printed character and a handwritten character indicates one set of information. For example, there is such a case in which "20" is printed in a field for writing a year of the Christian era and "08", etc., which is two digits of the year, is written by hand on the right side of "20" so as to represent "2008". If, as disclosed in Japanese Patent Laid-Open No. 2006-92346, the areas of the printed characters and the handwritten characters are separated and OCR processes are separately performed to such a form as described above, "20" and "08" may be respectively recognized as different words, so that the character information indicative of "2008" cannot be obtained.

The purpose of the present disclosure is to obtain appropriate character information from a result of an OCR process.

SUMMARY OF THE INVENTION

The image processing apparatus of the present disclosure includes: an obtaining unit configured to obtain information that has been obtained by performing an OCR (Optical Character Recognition) process on image data obtained by reading a document including at least one handwritten character string and at least one printed character string; a display control unit configured to highlight and display at least one character information area including a handwritten character string out of character information areas including character information in an image represented by the image data; a receiving unit configured to receive a character information area including a handwritten character string specified by a user out of the at least one character information area including the handwritten character string; a selecting unit configured to select at least one combination candidate area, the combination candidate area being a character information area other than the character information area including the handwritten character string specified by the user and to be combined with the character information area including the handwritten character string specified by the user; and a combining unit configured to combine character information in the character information area including the handwritten character string specified by the user and character information in the combination candidate area.

Further features of the present invention will become apparent from the following description of exemplary embodiments with reference to the attached drawings.

BRIEF DESCRIPTION OF THE DRAWINGS

FIGS. 8A through 8C are diagrams illustrating examples of an input image and an item list of the image processing server;

FIGS. 10A through 10D are diagrams illustrating examples of image processing performed by the image processing server;

FIG. 11 is a diagram illustrating an example of a character information extraction result;

FIGS. 13A through 13G are diagrams illustrating examples of a screen displayed on the operation unit of the image forming apparatus;

FIG. 14 is a diagram illustrating an example of extracted character information data; and FIGS. 15A through 15D are diagrams illustrating examples of a screen displayed on the operation unit of the image forming apparatus.

DESCRIPTION OF THE EMBODIMENTS

Hereinafter, an explanation is given of the embodiments with reference to the drawings. Note that it is not intended that the embodiments below limit the present disclosure, and all of the combinations of the features explained in the present embodiments are not necessarily essential.

First Embodiment

[System Configuration]

Figure 1:
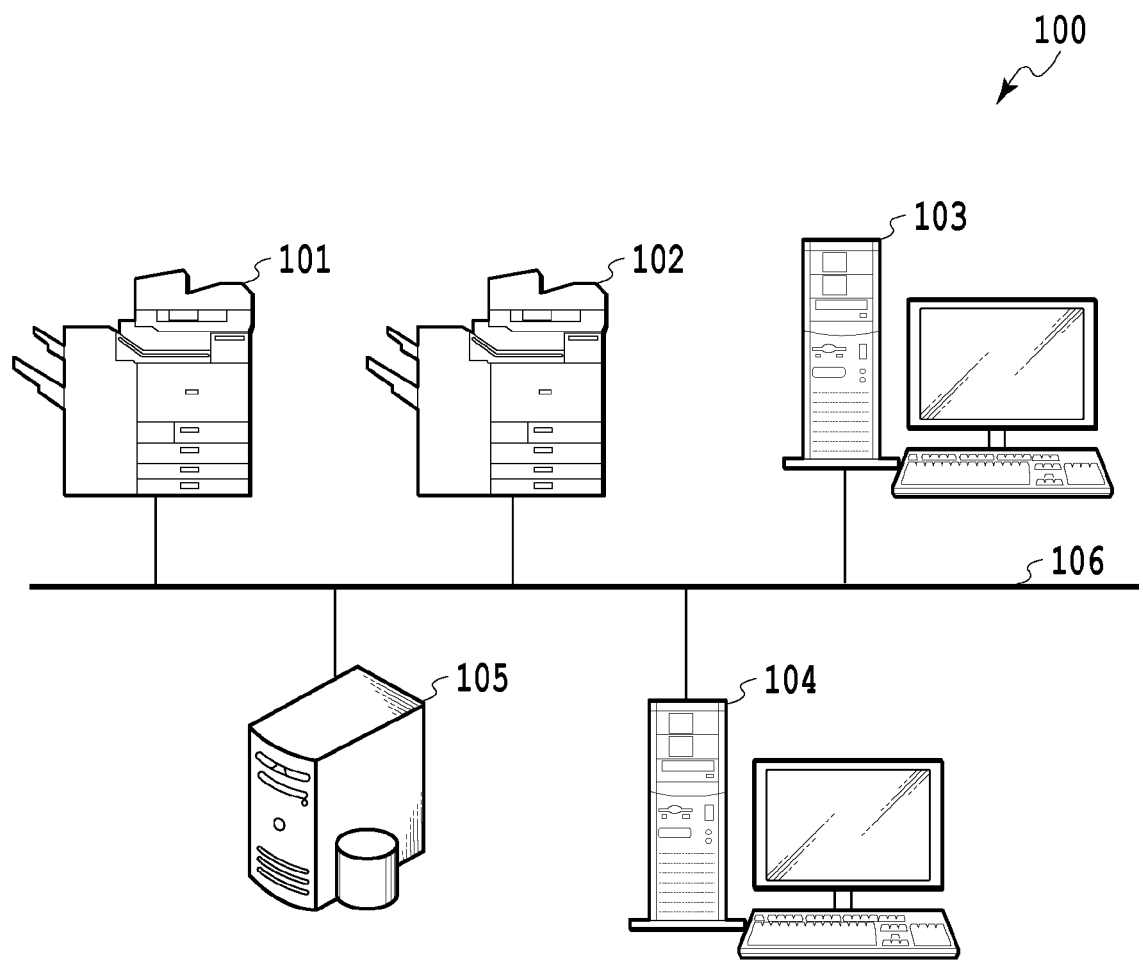
FIG. 1 is a diagram illustrating a configuration example of an image processing system.

FIG. 1 is a diagram illustrating an example of the configuration of an image processing, system. The image processing system 100 includes image forming apparatuses 101 and 102, PCs 103 and 104, and an image processing server 105. The image forming apparatuses 101 and 102, the PCs 103 and 104, and the image processing server 105 are connected to the network 106, so as to be mutually communicable.

Although the case where there are two image forming apparatuses 101 and 102 is illustrated as an example in FIG. 1, the number of image forming apparatuses can be a given number, which may be one or more. Hereinafter, although an explanation is given of the image forming apparatus 101 on behalf of the explanations of the image forming apparatuses 101 and 102 unless otherwise specified, the image forming apparatus 102 has the same functions as those of the image forming apparatus 101.

The image forming apparatus 101 is capable of receiving a printing request (print data) of image data from the PCs 103 and 104, which are information processing terminals, and is capable of printing the image data. Further, the image forming apparatus 101 is capable of reading a document as image data by use of a scanner 203 (see FIG. 2) and is capable of printing the read image data. Moreover, the image forming apparatus 101 is capable of saving print data received from the PCs 103 and 104 and is capable of sending image data read by the scanner 203 to the PCs 103 and 104 as well. Further, the image forming apparatus 101 is capable of sending image data to the image processing server 105 and requesting for image processing such as an OCR process. Additionally, the image forming apparatus 101 also functions as an image processing apparatus, with which functions presided by a publicly-known image forming apparatus such as an MFP (Multifunction Peripheral) can be implemented.

The image processing server 105 is an information processing apparatus capable of obtaining image data from the image forming apparatus 101 and performing an OCR process. Although the image processing system 100 including one server is illustrated as an example in FIG. 1, the number of servers in the image processing system 100 can be a given number, which may be one or more. In a case where multiple servers are present in the image processing system 100, it is possible that the usage of each server is different. Note that it is also possible that the image processing server 105 is arranged in the cloud, that is, on the Internet.

The network 106 is a LAN (Local Area Network), the Internet, or the like, for example, and the apparatuses in the image processing system 100 are capable of communicating with each other via the network.

Here, prior to the explanation of the present embodiment, an explanation is given of an outline of the present embodiment. The image forming apparatus 101 scans a form including a handwritten character and a printed character, such as an application form, so as to generate image data of an input image 801 (see FIG. 8A) and send the image data to the image processing server 105. Regarding the image data, the image processing server 105 performs an OCR process to each of the handwritten character and the printed character separately, so as to send character information, information representing the areas of the character information (character information areas), etc., which are recognized as a result of the OCR process, to the image forming apparatus 101. In the image forming apparatus 101, the character information area of a handwritten character specified by the user and other character information areas (combination candidate areas) related to the character information area of the handwritten character specified by the user are displayed on a UI screen, so that the user selects any of the combination candidate areas. Then, the image forming apparatus 101 combines the character information of the combination candidate area selected by the user and the character information of the handwritten character. Therefore, for example, it is assumed that an OCR process is performed to a form in which "20" is printed in a field for writing a year of the Christian era and "08", which is the last two digits of the year, is written by hand on the right side of "20". As a result of the OCR process on such a form, the handwritten character and the printed character are separately recognized as different character information (words) such as "20" and "08". Even in this case, the different character information can be easily combined into character information indicative of "2008".

[Hardware Configuration]

Figure 2:
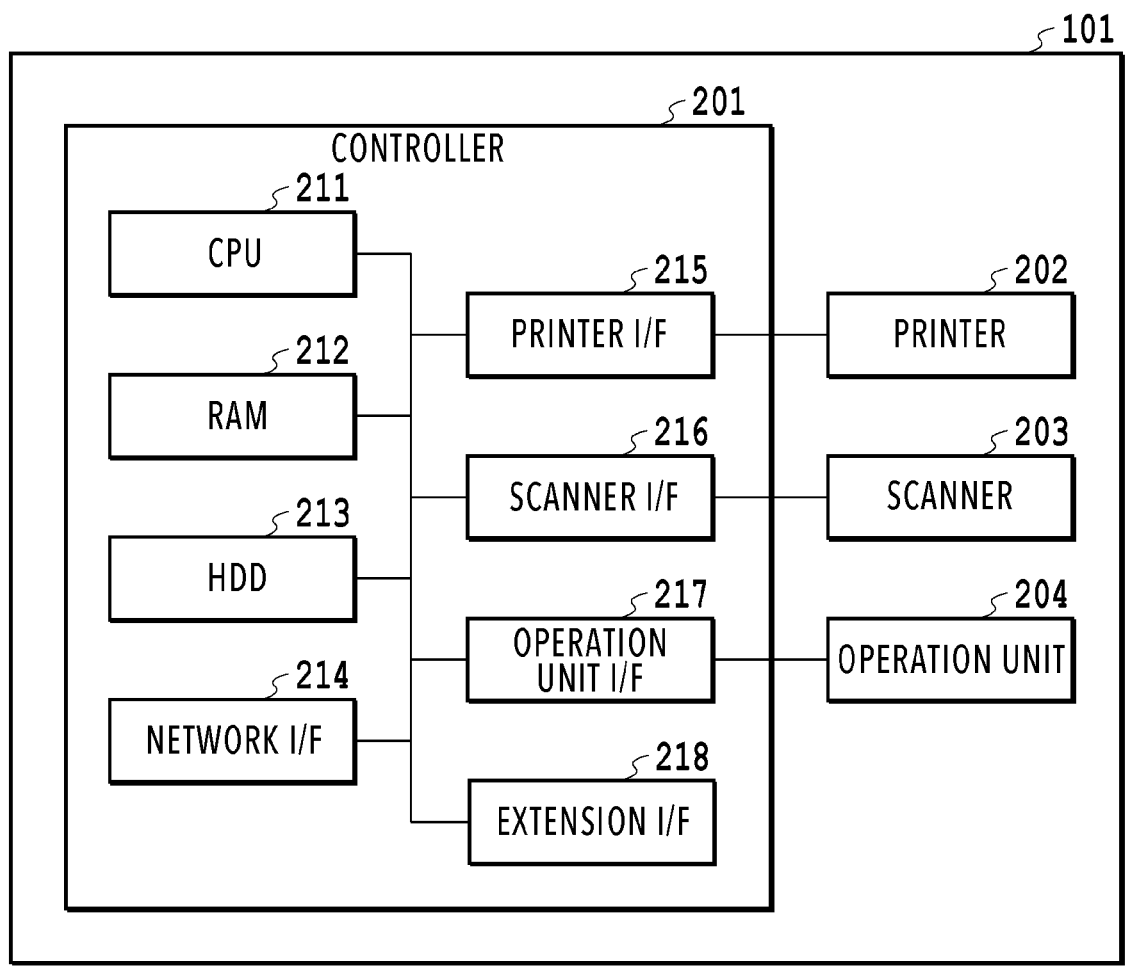
FIG. 2 is a diagram illustrating a hardware configuration example of an image forming apparatus.

FIG. 2 is a diagram illustrating an example of the hardware configuration of the image forming apparatus 101. The image forming apparatus 101 includes a controller 201, a printer 202, a scanner 203, and an operation unit 204.

The controller 201 includes a CPU 211, a RAM 212, an HDD 213, a network I/F 214, a printer I/F 215, a scanner I/F 216, an operation unit I/F 217, and an extension I/F 218.

The CPU 211 is capable of transmitting and receiving data to and from the RAM 212, the HDD 213, the network I/F 214, the printer I/F 215, the scanner I/F 216, the operation unit I/F 217, and the extension I/F 218. Furthermore, the CPU 211 loads a command from the HDD 213 into the RAM 212 and executes the command loaded into the RAM 212.

The HDD 213 stores a command that can be executed by the CPU 211, a setting value to be used by the image forming apparatus 101, data related to processing that is requested by the user, etc. The RAM 212 temporarily stores a command retrieved from the HDD 213 by the CPU 211. Furthermore, the RAM 212 is also capable of storing various kinds of data necessary for executing a command. For example, image data obtained for image processing is loaded into the RAM 212, so that it is possible to perform image processing to the image data.

The network I/F 214 is an interface for performing network communication with another apparatus in the image processing system 100. The network I/F 214 is capable of outputting information indicative of reception of data to the CPU 211 and is capable of outputting data in the RAM 212 to the network 106. The printer I/F 215 is capable of outputting image data, which is output by the CPU 211, to the printer 202 and is capable of outputting a status of the printer, which is obtained from the printer 202, to the CPU 211.

The scanner I/F 216 outputs an image reading instruction, which is output by the CPU 211, to the scanner 203. The scanner I/F 216 is capable of outputting image data, which is obtained from the scanner 203, to the CPU 211 and is capable of outputting a status of the scanner, which is obtained from the scanner 203, to the CPU 211.

The operation unit I/F 217 is capable of outputting an instruction from the user, which is input through the operation unit 204, to the CPU 211. Since the operation unit 204 of the present embodiment also functions as a display unit, it is possible to output screen information, which is for allowing the user to provide an operation, to the operation unit 204. The extension I/F 218 is an interface that allows an external device to connect to the image forming apparatus 101. For example, the extension I/F 218 includes an interface in USB (Universal Serial Bus) format. In a case where an external storage device such as a USB memory is connected to the extension I/F 218, the image forming apparatus 101 is capable of reading data stored in the external storage device and is capable of writing data to the external storage device.

The printer 202 is capable of printing image data obtained via the printer I/F 215 on a print medium such as printing paper and is capable of outputting a status of the primer 202 to the printer I/F 215.

The scanner 203 is capable of reading a document placed on the platen of the scanner 203 according to an image reading instruction obtained via the scanner I/F 216, so as to digitize and output the scanning result to the scanner I/F 216. Furthermore, the scanner 203 is capable of outputting a status of the scanner to the scanner I/F 216.

The operation unit 204 is an interface that allows the user to provide various kinds of instructions to the image forming apparatus 101. The operation unit 204 also includes a display unit such as a liquid crystal screen provided with a touch panel, so that it is possible to provide an operation screen to the user and to receive an operation from the user.

Figure 3:
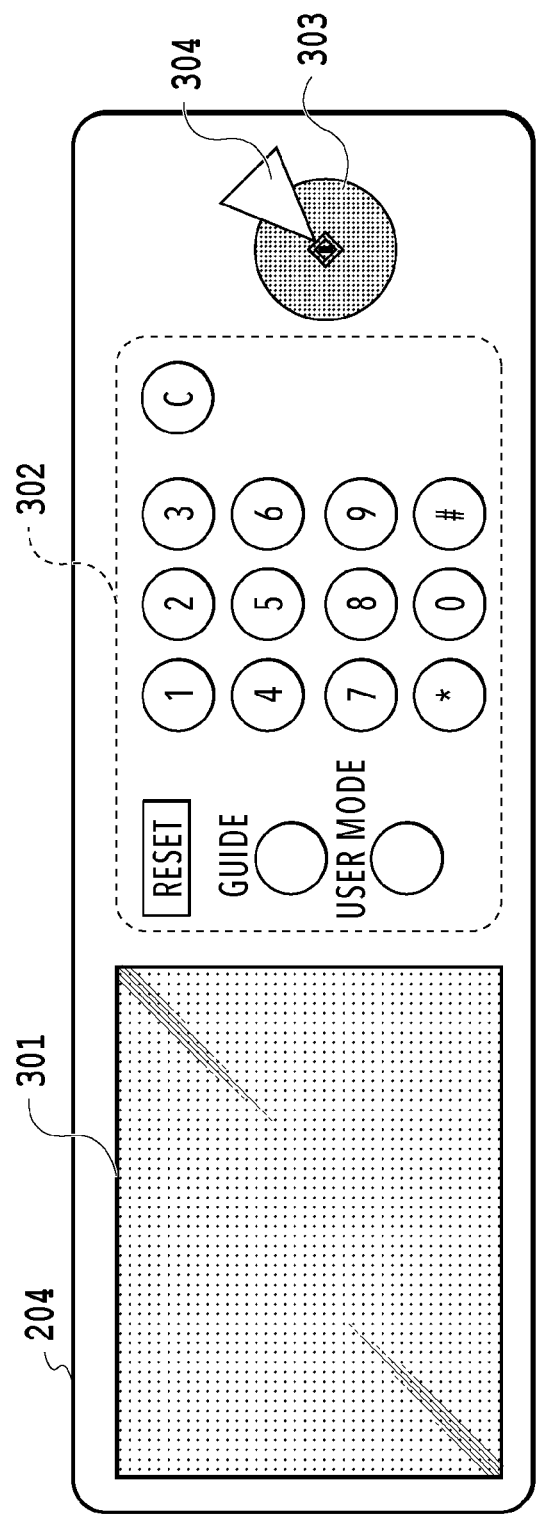
FIG. 3 is a diagram illustrating a configuration example of an operation unit of the image forming apparatus.

FIG. 3 is a diagram representing an example of the operation unit 204 of the image forming apparatus 101. The operation unit 204 is configured with a touch panel screen 301, a setting key 302, a cancel key 304, and a start key 303. The user performs setting of each job by use of the touch panel screen 301 and setting keys 302 and starts a job by pressing the straight key 303. Note that it is possible for the user to stop a once-started job by pressing the cancel key 304. For example, the herein-mentioned job may be a copy job, a job for sending scanned image data to the image processing server 105 via the network I/F 214, or the like.

Figure 4:
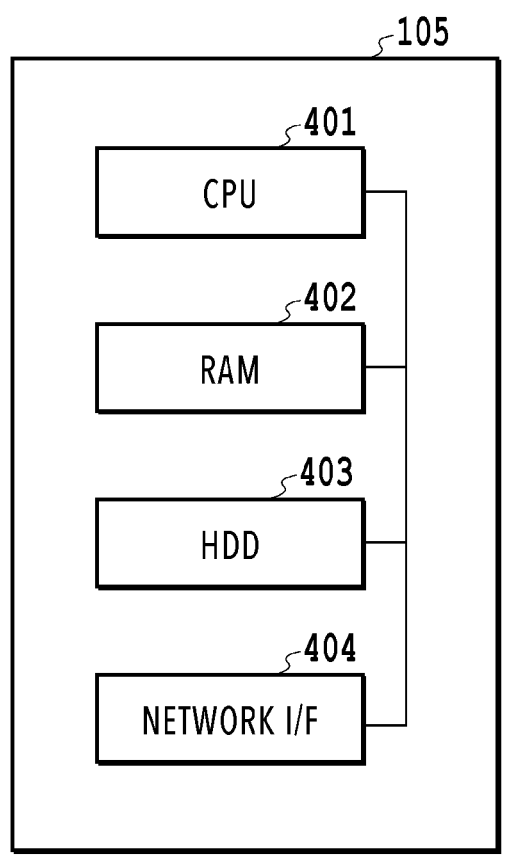
FIG. 4 is a diagram illustrating a hardware configuration example of an image processing server.

FIG. 4 is a hardware configuration diagram of the image processing server 105. The image processing server 105 includes a CPU 401, a RAM 402, an HDD 403, and a network I/F 404.

The CPU 401 entirely controls the image processing server 105 and is capable of controlling transmission and reception of data to and from the RAM 402, the HDD 403, and the network I/F 404. Moreover, the CPU 401 is capable of loading a control program (command) retrieved from the HDD 403 into the RAM 402 and executing the command stored in the RAM 402.

The image processing server 105 is capable of performing image processing to image data received from the image forming apparatus 101 via the network I/F 404. Image processing that can be performed by the image processing server 105 includes an OCR (Optical Character Recognition t process for image data and a block segmentation process for segmenting image data into area blocks for respective elements such as a character string and a background of the image data.

[Functional Framework of the Image Forming Apparatus]

Figure 5:
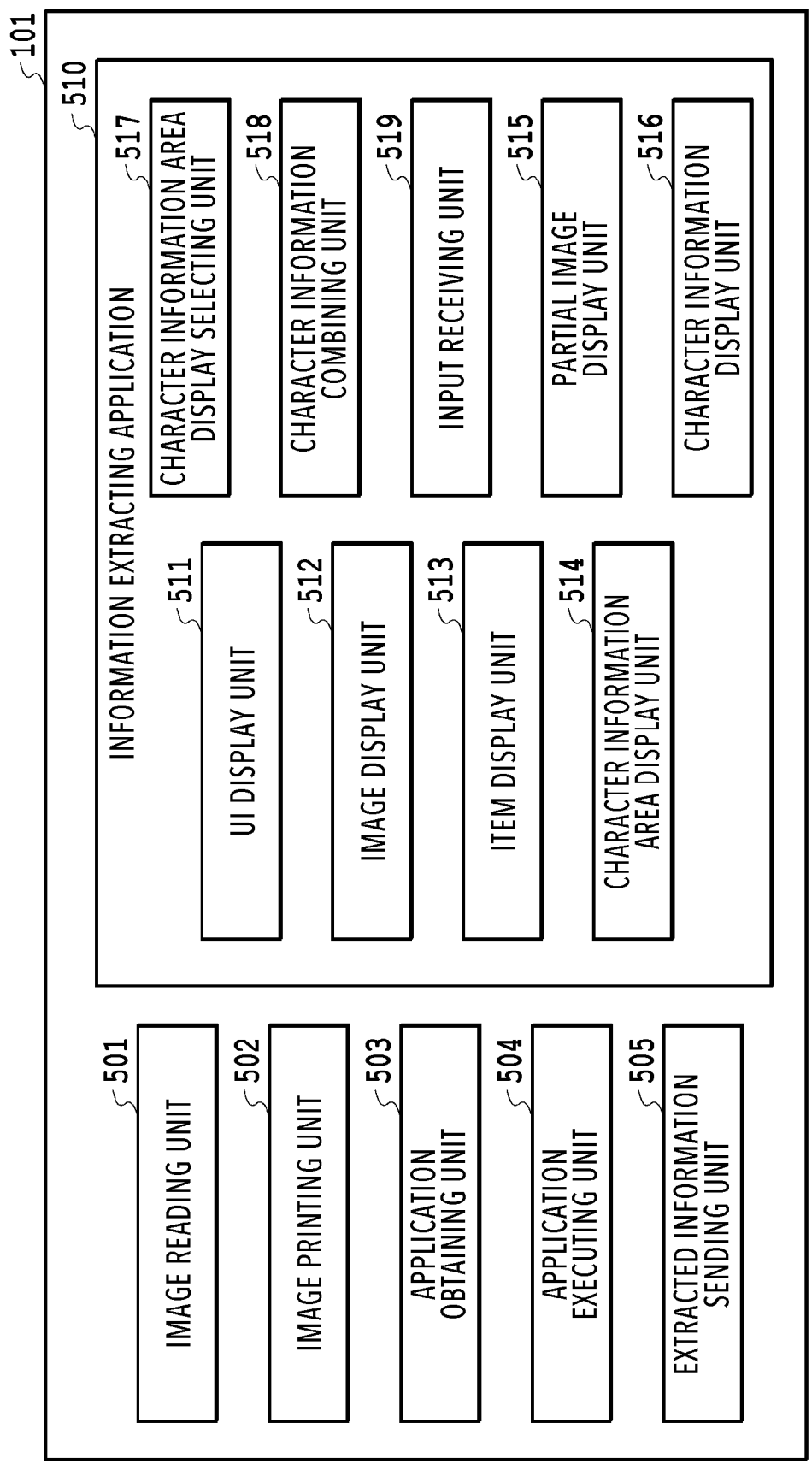
FIG. 5 is a diagram illustrating a function framework example of the image forming apparatus.

FIG. 5 is a diagram for explaining the functional framework of the image forming apparatus 101. The image forming apparatus 101 includes an image reading unit 501, an image printing unit 502, an application obtaining unit 503, an application executing unit 504, an extracted information sending unit 505, and an information extracting, application 510.

The image reading unit 501 converts the description contents of a document read by the scanner 203 into image data and stores the image data in the HDD 213. Furthermore, the image reading unit 501 sends the image data of the document to an apparatus such as the image processing server 105 on the network 106 via the network I/F 214.

The image printing unit 502 loads imaged data stored in the HDD 213 or image data sent from another apparatus on the network 106 into the RAM 212, and the image printing unit 502 operates the printer 202 to print the loaded image data.

The application obtaining unit 503 obtains the later-described application data and stores the application data in the HDD 403.

The application executing unit 504 includes a web browser for executing a web application, and the application executing unit 504 executes application data obtained by the application obtaining unit 503, The application executing unit 504 displays the executed application on the touch panel screen 301 and notifies the application of a touch operation to the touch panel screen 301 and pressing of a setting key 302.

The extracted information sending unit 505 sends information extracted by the information extracting application 510 to another apparatus such as the PC 103 of the image processing system 100.

The information extracting application 510 is an application that extracts a character included in an image represented by image data, which is generated by the image reading unit 501. In the explanation of the present embodiment, it is assumed that the information extracting application 510 is in a form of web application. A web application is configured with page description data described in a web page description language and script data described in a script language. For example, the web page description language is HTML (Hyper Text Markup Language) and the script language is Java Script (registered trademark).

Page description data of the information extracting application 510 includes image data generated by the image reading unit 501 and a result of an OCR process performed to the image data by the image processing server 105. Application data including page description data and script data of the information extracting application 510 is generated by the later-described information extracting application generating unit 623 of the image processing server 105.

The information extracting application 510 includes a display control unit, a character information area display selecting unit 517, a character information combining unit 518, and an input receiving unit 519, which are implemented by page description data and script data. The UI display unit 511, the image display unit 512, the item display unit 513, the character information area display unit 514, the partial image display unit 515, and the character information display unit 516 are display control units for controlling the touch panel screen 301 to display UI screens.

The UI display unit 511 displays operation parts such as a button to be operated by the user and UI parts for displaying information such as a processing progress. The image display unit 512 displays image data. The item display unit 513 displays items of information extracted by the information extracting application 510.

The character information area display unit 514 highlights and displays a character information area included in an input image. For example, the character information area display unit 514 superimposes a character information area, which can be specified by the user and is represented by a rectangular frame, on an input image and displays the input image with the character information area as a UI screen. The partial image display unit 515 displays a partial image obtained by cutting out the image in a character information area of an input image. The character information display unit 516 displays character information extracted from a character information area and, further, receives input for correcting the character information.

The character information area display selecting unit 517 selects any one of the character information areas displayed by the character information area display unit 514. Further, the character information area display selecting unit 517 selects one or more character information areas as candidates to be combined with a character information area, selected by the user.

The character information combining unit 518 combines character information extracted from multiple character information areas into one set of character information. The input receiving unit 519 receives input to UI parts displayed by the UI display unit 511, the image display unit 512, the item display unit 513, and the character information area display unit 514.

The function of each unit of the image forming apparatus 101 is implemented by the CPU 211 loading a program code stored in the HDD 213 into the RAM 212 and executing the program code. Alternatively, a part or all of the functions of the respective units in FIG. 5 may be implemented by hardware such as an ASIC or an electronic circuit.

[Functional Framework of the Image Processing Server]

Figure 6:
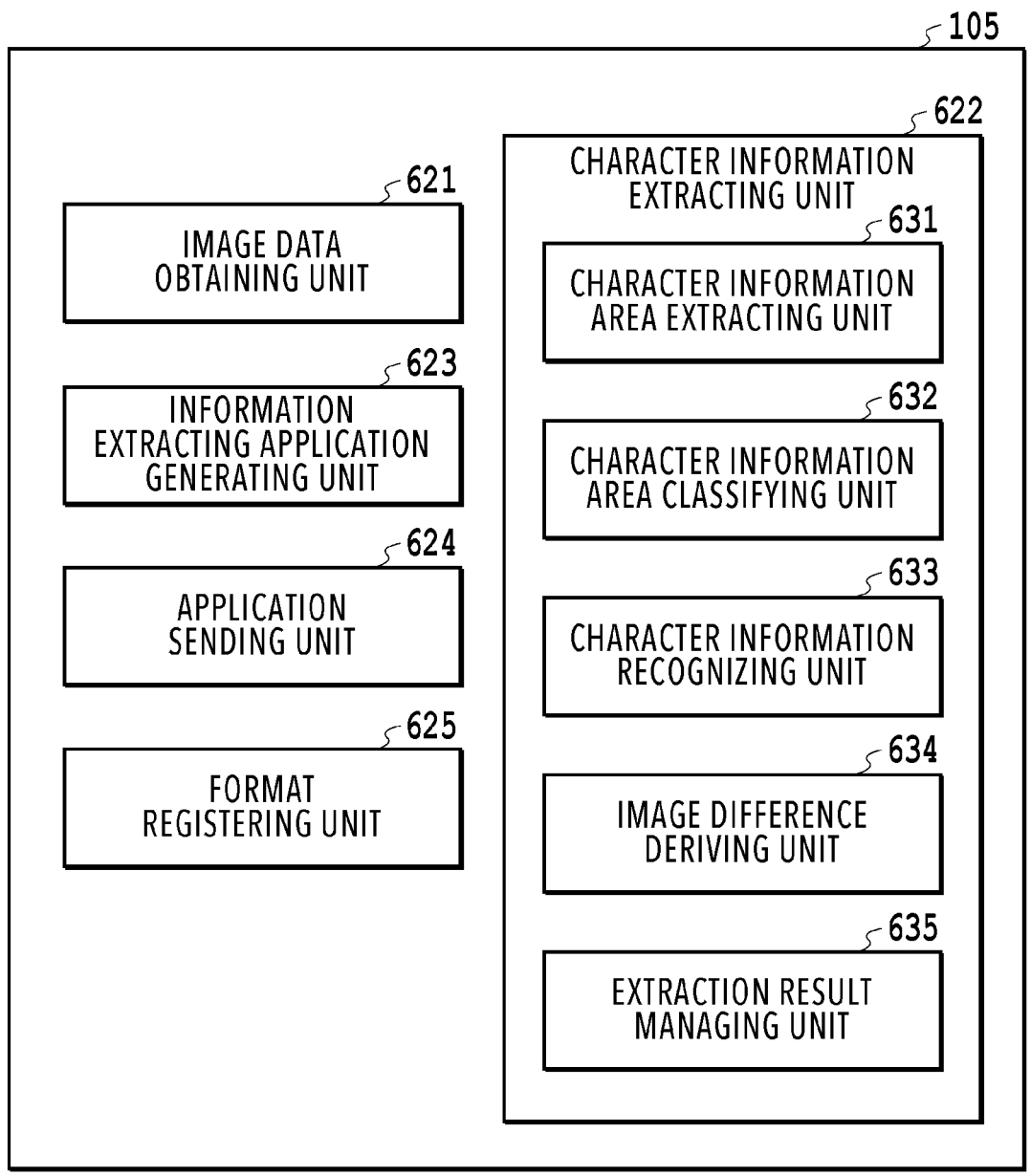
FIG. 6 is a diagram illustrating a functional framework example of the image processing server.

FIG. 6 is a diagram for explaining the functional framework of the image processing server 105. The image processing server includes an image data obtaining unit 621, a character information extracting unit 622, an information extracting application generating unit 623, an application sending unit 624, and a format registering unit 625.

The image data obtaining unit 621 obtains image data sent to the image processing server 105.

The character information extracting unit 622 makes each of the units 631 through 635 to function, so as to extract a character information area, based on obtained image data, and to perform a character recognition process (OCR process) to the character information area, in order to extract a character included in the image.

The character information area, extracting unit 631 extracts a character information area, in which character information is included, from an image represented by image data. The character information area classifying unit 632 classifies an extracted character information area into a predetermined category. Since the information extracting application 510 extracts areas including a printed character and a handwritten character, which is written by hand in a form, as character information areas, the character information area classifying unit 632 at least classifies a character information area into a category of a handwritten character, a printed character, or the like.

The character information recognizing unit 633 mainly performs an OCR process for each character information area in a suitable method according to the classification of the character information area. For example, compared to a printed character, a handwritten character has lower density, and there is larger difference in the glyphs (character shapes), depending on the person who wrote the handwritten character. Therefore, in a case where an OCR process is performed to a handwritten character, the character information recognizing unit 633 performs an OCR process dedicated to handwritten characters, in which the contrast is increased and the noise removal is strengthened for a binarization process. Alternatively, the character information recognizing unit 633 performs an OCR process dedicated to handwritten characters by use of a recognition engine that has learned b deep learning, etc., in which determination is made not only by a feature point on a per character basis, but also by the preceding and following characters. By such an OCR process dedicated to handwritten characters, it is possible to improve the recognition accuracy of both handwritten characters and printed characters.

The image difference deriving unit 634 derives the difference between pixel values of different image data, so as to generate a difference image. The extraction result managing unit 635 saves extracted character information.

The information extracting application generating unit 623 generates application data of the information extracting application 510 executed by the image forming apparatus 101. The information extracting application generating unit 623 has templates of page description data and script data of the information extracting application 510. This template includes an area for the item display unit 513 to register the items to be displayed on the UI screen in the image forming apparatus 101. The information extracting application generating unit 623 replaces the area with an item list registered in advance. Further, the information extracting application generating unit 623 inserts an OCR process result, which is obtained by the character information extracting unit 622, into the page description data in the template.

The application sending unit 624 sends the application data generated by the information extracting application generating unit 623 to the image forming apparatus 101. The format registering unit 625 registers format data to be used by the character information extracting unit 622 and the information extracting application generating unit 623.

The function of each unit of the image processing server 105 is implemented by the CPU 401 loading a program code stored in the HDD 403 into the RAM 402 and executing the program code. Alternatively, a part or all of the functions in the respective units in FIG. 6 may be implemented by hardware such as an ASIC or an electronic circuit.

[About the Processing Flow of the Entire System]

Figure 7:
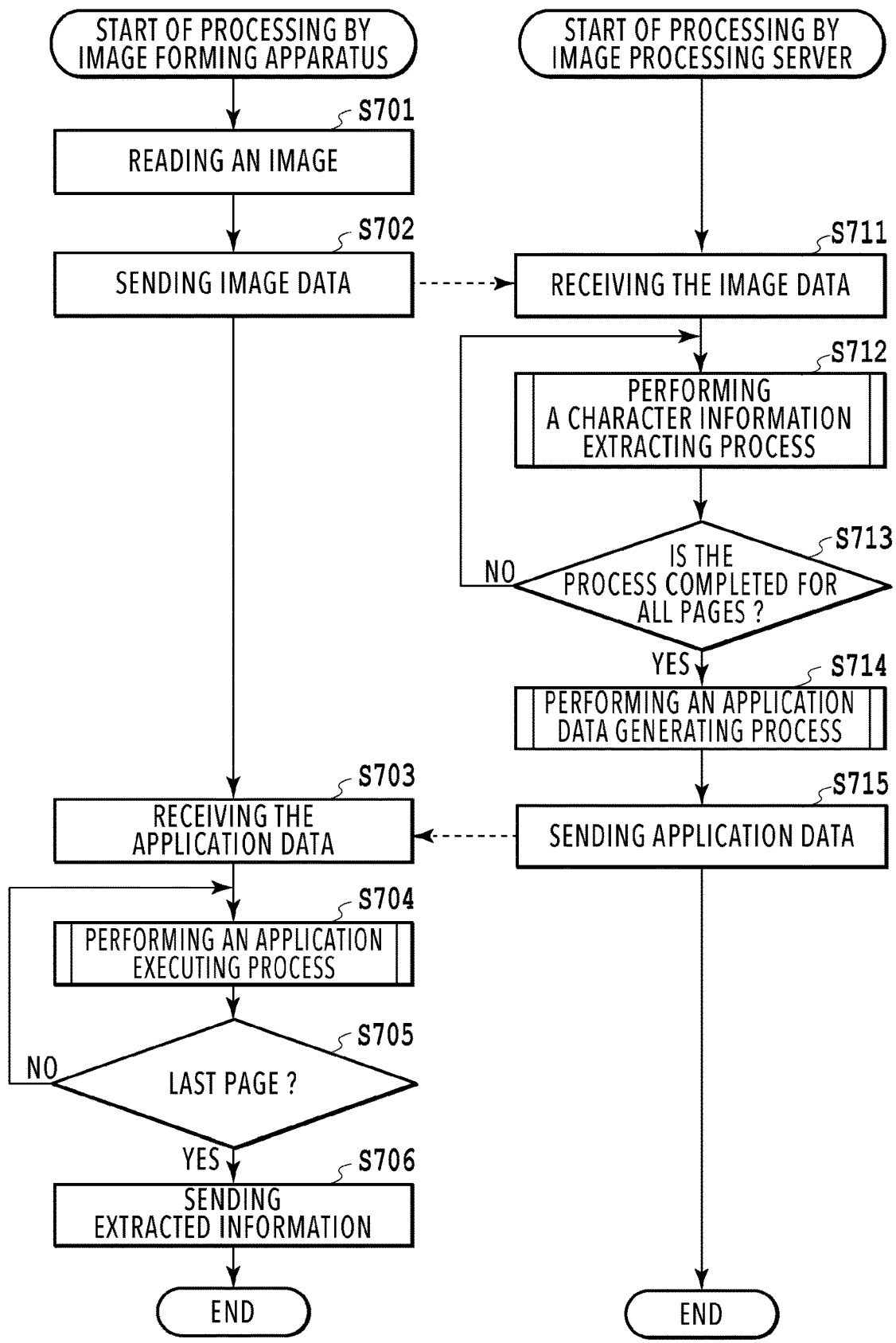
FIG. 7 is a sequence diagram for explaining an overall processing procedure of the image processing system.

FIG. 7 is a sequence diagram for explaining the overall processing flow of the image processing system 100 in the present embodiment. With reference to FIG. 7, an explanation is given of a series of processes for extracting character information from image data of a scanned document.

In S701, the image reading, unit 501 receives a document reading instruction in response to pressing of the start key 303 by the user and reads the document placed on the platen of the scanner 203.

In S702, the image forming apparatus 101 sends the image data of the read document to the image processing server 105. In a case where multiple documents are placed, image data for multiple pages are sent. Information representing the type of the document herein read by the scanner is also sent to the image processing server 105. For sending the type of document, for example, the type specified by the user from format data registered by the format registering unit 625 is sent.

In S711, the image data obtaining unit 621 obtains the image data sent from the image forming apparatus 101. In S712, the character information extracting unit 622 performs a character information extracting process to obtained image data on a per page basis. Details of the character information extracting process is to be described later.

In S713, whether the character information extracting process is completed for all pages is determined. In a case where there is any unprocessed page, the processing returns to S712, so that the character information extracting process is performed on the unprocessed pages. In a case where the character information extracting process is completed for all pages, the processing proceeds to S714.

In S714, the information extracting application generating unit 623 performs an application data generating process. Details of the application data generating process is to be described later. In S715, the application sending unit 624 sends the application data generated in S714 to the image forming apparatus 101.

In S703, the application obtaining unit 503 obtains the application data generated in S714. In S704, the application executing unit 504 executes the information extracting application 510 by use of the obtained application data.

By executing the information extracting application 510, in the image forming apparatus 101, it is possible to combine character information obtained from each of the character information area of a handwritten character and the character information area of a printed character. Therefore, it is possible to obtain appropriate character information even from a result of an OCR process performed to a document including both a handwritten character and a printed character. This process is to be described later. The application executing unit 504 processes the image data on a per page basis.

In S705, whether the application executing process for the last page is completed is determined. In a case where the process for the last page is not completed, the processing returns to S704, so that the application executing process is performed for unprocessed pages. In a case where the process for the last page is completed, the processing proceeds to S706.

In S706, the extracted information sending unit 505 sends extracted information to an apparatus specified by the user, such as the PC 103 or 104. The extracted information sent in S706 is to be described later.

[Character Information Extracting Process]

FIGS. 8A through 8C are diagrams for explaining an image, etc., to be the processing target of the character information extracting process, which is performed in S712. FIG. 8A is an example of an input image 801 representing image data of a document read by the image reading unit 501, which is sent to the image processing server 105. The input image 801 is an image obtained by reading a form, in which items and the like are printed in advance and information is written by hand on the printed items, by use of the scanner 203 of the image forming apparatus 101.

FIG. 8B is image data of a form (unfilled image 802) in which handwritten parts are not written in the input image 801. That is, the unfilled image 802 is an image in which the handwritten parts of the input image 801 have not written.

FIG. 8C is a diagram illustrating an item list 803. The item list 803 is a list of items of information included in the input image 801, and the information of the item list 803 is extracted by the information extracting application 510. Although it is assumed that the item list 803 is in CSV format in which item names are separated by commas in the present embodiment, it is also possible that the item list 803 is represented in other formats (XML, JSON, etc.). In the present embodiment, the unfilled image 802, which corresponds to the input image 801 that has not been handwritten, and the item list 803 are stored in advance in the HDD 403 of the image processing server 105 by the format registering unit 625.

Figure 9A:
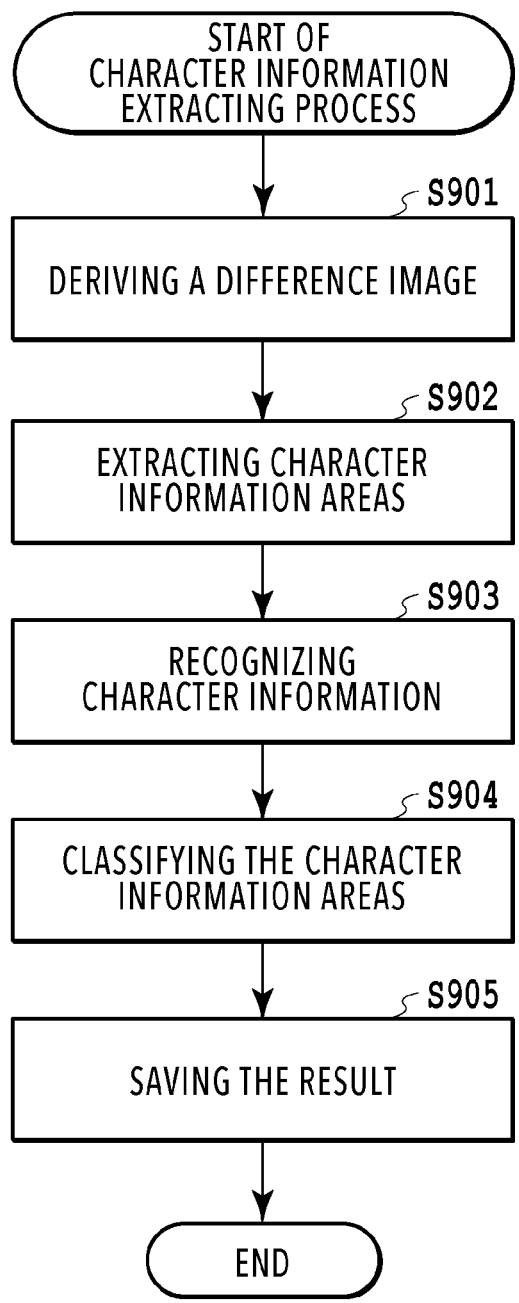
FIGS. 9A and 9B are flowcharts for explaining processing procedures of the image processing server.

FIG. 9A is a flowchart for explaining the details of the character information extracting process (S712) executed by the image processing server 105. The series of processes illustrated in the flowchart of FIG. 9A is performed by the CPU of the image processing server 105 loading a program code stored in the ROM into the RAM and executing the program code. Furthermore, a part or all of the functions in the steps of FIG. 9A may be implemented by hardware such as an ASIC or an electronic circuit Note that the symbol "S" in the explanation of each process means that it is a step in the flowchart, and the same applies to the following flowcharts.

In S901, the image difference deriving unit 634 derives a difference between the image data of the input image 801 and the image data of the unfilled image 802 corresponding to the input image 801, so as to generate image data of a difference image 901. Since the image processing server 105 has obtained information representing the type of document read by the scanner, the unfilled image 802 corresponding to the input image 801 according to the type of document is obtained from the HDD 403.

Figures 10A, 10B, 10C, 10D:
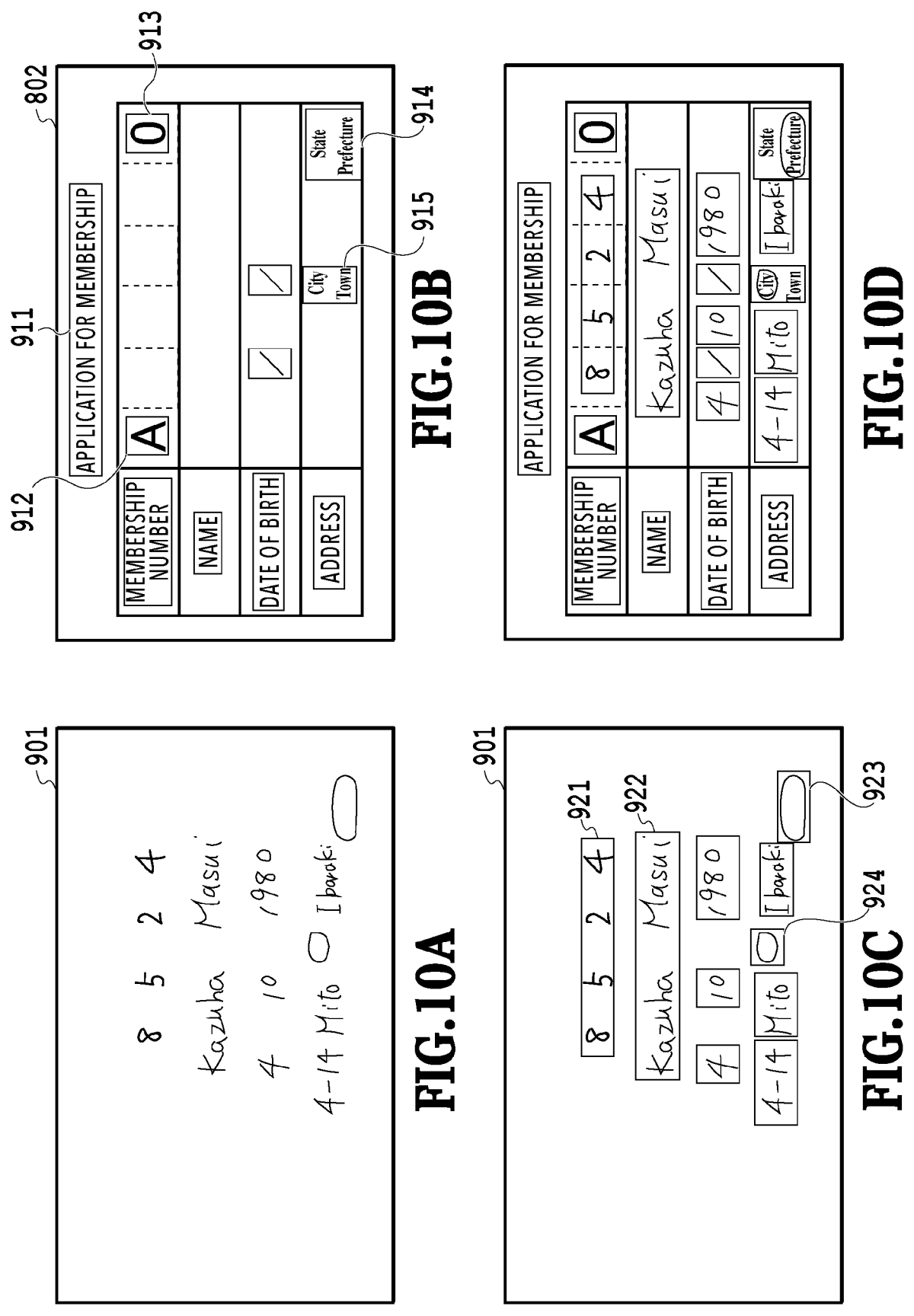

FIG. 10A is an example of the difference image 901 generated by the image difference deriving unit 634. The difference image 901 is an image in which the handwritten parts are extracted from the input image 801.

In S902, the character information area extracting unit 631 performs a process of extracting a character information area to each of the image data of the unfilled image 802 and the image data of the difference image 901. There is no limitation about the method of extracting a character information area. For example, a character information area is extracted by removing lines that are longer than a predetermined length in an image and deriving a rectangle that includes black pixels adjacent to each other. For example, the predetermined length corresponds to the predicted size of a character.

FIG. 10B is a diagram illustrating character information areas extracted from the unfilled image 802. FIG. 10C is a diagram illustrating character information areas extracted from the difference image 901. The extracted character information areas are extracted as the areas represented by the rectangles in the images. For example, the character information areas 911 through 915 are extracted from the unfilled image, and the character information areas 921 through 924 are extracted from the handwritten image.

In S903, the character information recognizing unit 633 performs an OCR process to the respective character information areas of the difference image 901 and the unfilled image 802, so as to recognize character information of the character information areas. Only primed characters are displayed in the unfilled image 802, and only handwritten characters are extracted in the difference image 901. Therefore, it is possible to perform the OCR process in a suitable method according to whether the character information area corresponds to a printed character or a handwritten character. Accordingly, it is possible to improve the accuracy of character recognition, compared to the case where an OCR process is performed to the input image 801.

In S904, the character information area classifying unit 632 classifies the character information areas into predetermined categories. The character information area classifying unit 632 at least classifies an area extracted from unfilled image data into a category different from that of an area extracted from handwritten image data.

As for the character information areas 923 and 924 that are closed regions such as "o" in the difference image 901, there is such a case in which, lithe unfilled image 802 and the difference image 901 are overlapped with each other, the character information areas 914 and 915 are present in the unfilled image 802 at the positions overlapping with the closed regions. In such a case, each of the character information areas 923 and 924 is classified as "HANDWRITTEN MARK".

In addition, among the character information areas extracted from the image data of the unfilled image 802, each of the character information areas 911 through 913, which does not overlap with any of the handwritten mark areas, is classified as "PRINTED CHARACTER". Among the character information areas extracted from the image data of the difference image 901, each of the character information areas 921 and 922, which is not a handwritten mark area, is classified as "HANDWRITTEN CHARACTER". Hereinafter, a character information area classified as a handwritten character may be referred to as a "handwritten character area".

Note that the character information areas 911 through 915 and the character information areas 921 through 924 with the reference signs in FIG. 10B and FIG. 10C are merely parts of the extracted character information areas, and it is indicated that the other areas represented by the rectangles in the images have been extracted as character information areas.

In S905, the extraction result managing unit 635 stores a character information extraction result 1101, in which character information (OCR results) recognized from the character information areas, the positional information of the character information areas, and the classifications of the character information areas are associated with each other, in the HDD 403.

FIG. 11 is a diagram illustrating a character information extraction result 1101, which is a table for the extraction result managing unit 635 to manage the extraction results of character information. In the character information extraction result 1101, data of each row including a number 1102, coordinates 1103, a size 1104, a classification 1105, an OCR result 1106 are stored in association with each other for a per record basis (for a per row basis). In addition, a record is generated for each character information area.

Coordinates 1103 hold coordinate values representing positional information of a character information area. As for coordinates of an input image, a coordinate system in which the upper left corner is the origin, the height extends in the downward direction, and the width extends in the rightward direction is used. The left side of coordinates 1103 holds a coordinate of the width direction, and the right side of coordinates 1103 holds a coordinate of the height direction.

A size 1104 holds values representing the size of a character information area. The left side of a size 1104 holds a value of a width size, and the right side of a size 1104 holds a value of a height size.

A classification 1105 holds the classification of a character information area. An OCR result 1160 holds character information recognized as; a result of an OCR process performed in the character information area associated with the record. Note that, in a case where a character information area is classified as "HANDWRITTEN MARK", the OCR result holds the character information recognized in the area of the handwritten mark in the unfilled image 802. A number 1102 holds a number for identification.

The extraction result managing unit 635 stores the character information extraction result 1101 as a file in XML format. The file format is not limited to XML and may be JSON format or CSV format. Upon saving the character information extraction result 1101, the character information extracting process ends.

Note that it is also possible that the data of which the classification 1105 in the character information extraction result 1101 is a printed character is stored in the HDD 403 in advance instead of being generated each time the character information extracting process is performed. For example, it is also possible that data of a character information extraction result related to printed characters is stored for each type of form, and, in a case where a character information extracting process is newly performed, the character information extraction result related to the printed characters of the form to be the processing target is obtained. Then, a character information extraction result of extracted handwritten characters and handwritten marks is combined with the character information extraction result 1101 related to the printed characters, so as to generate the character information extraction result 1101 as illustrated in FIG. 11.

As described above, it is possible for the image processing server 105 of the present embodiment to extract a character information area, which is classified into a handwritten character or a printed character, and the character information thereof from image data of an image including a handwritten character and a printed character.

[Application Data Generating Process]

Figure 9B:
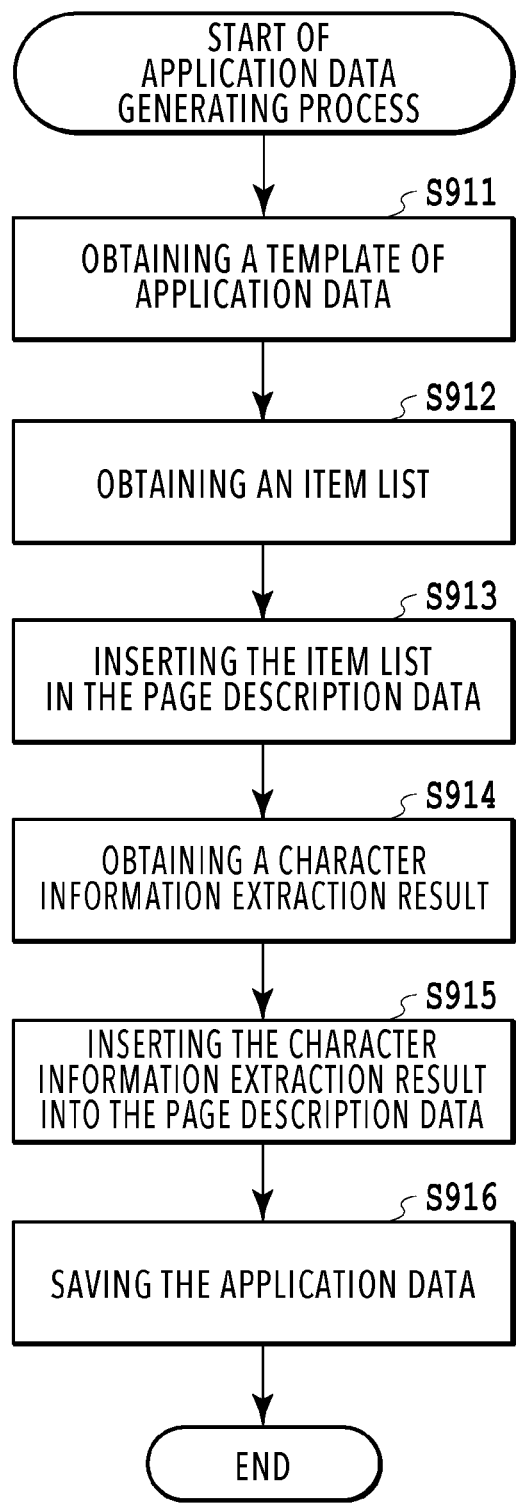

FIG. 9B is a diagram for explaining a detailed flow of the application data generating process (S714) executed by the image processing server 105.

In S911, the information extracting application generating unit 623 obtains a template of application data stored in the HDD 403 in advance. The parts of page description data of the template has a part in which an item list 803 is inserted and a part in which a character information extraction result 1101 is inserted.

In S912, the format registering unit 625 obtains an item list 803 stored in the HDD 403. In S913, the information extracting application generating unit 623 inserts the item list 803 to the template of the application data, so that the application of the image forming apparatus 101 can display the item list 803 on the touch panel screen 301.

In S914, the information extracting application generating unit 623 obtains a character information extraction result 1101 stored by the extraction result managing unit 635. In S915, the information extracting application generating unit 623 interprets the character information extraction result 1101, which is by XML format. The information extracting application generating unit 623 inserts the character information extraction result 1101 into the template of the application data, so that the application of the image forming apparatus 101 can refer to the character information extraction result 1101.

In S916, the information extracting application generating unit 623 stores the generated application data in the HDD 403 and ends the application data generating process.

[Application Executing Process]

Figure 12:
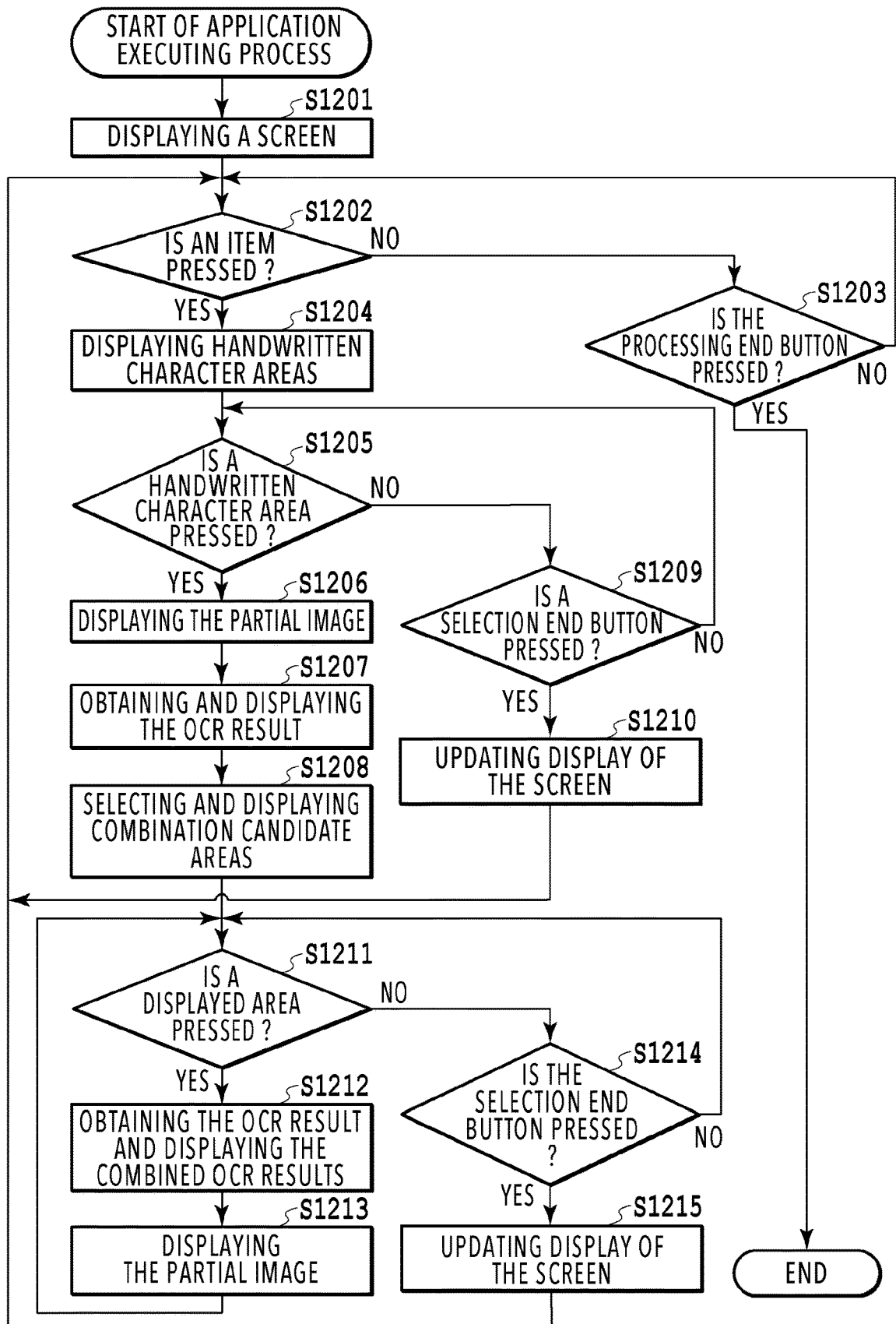
FIG. 12 is a flowchart for explaining a processing procedure of the image forming apparatus.

FIG. 12 is a flowchart, for explaining details of the application executing process (S704) performed by the image forming apparatus 101. In the application executing process, character information obtained as a result of the OCR processes are combined. Then, the combined character information and the items of an item list 803 are associated with each other, so as to generate data to be sent to another apparatus in the image processing system 100, such as the PCs 103 and 104.

The series of processes illustrated in the flowchart of FIG. 12 is per by the CPU of the image forming apparatus 101 loading a program code stored in the ROM into the RAM and executing the program code. Furthermore, a part or all of the functions in the steps of FIG. 12 may be implemented by hardware such as an ASIC or an electronic circuit.

The application executing process is executed on a per page basis in a case where the image data read by the image reading unit 501 includes multiple pages. The present flowchart is started in response to the image forming apparatus 101 starting the application executing process for the image data of the first page.

Figure 13A:
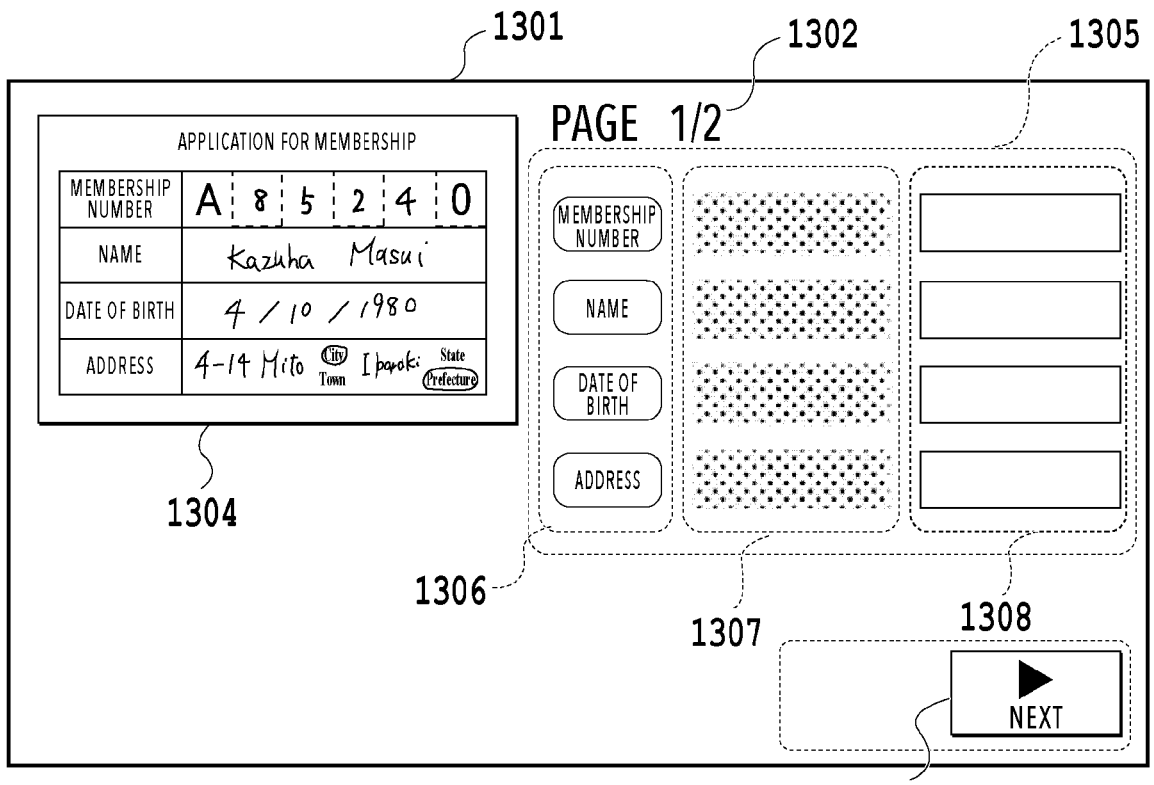

In S1201, the UI display unit 511 displays a UI screen on the touch panel screen 301. FIG. 13A is a diagram illustrating a UI screen 1301 displayed by the process of the present step. The processing page number 1302 of the UI screen 1301 is an area for notifying the user of what page the image data currently being processed is, in which the page number of the image read by the image reading unit 501 is displayed. The processing end button 1303 is an area representing a button for the user to provide an instruction for the end of the processing of the page being processed. The image display area 1304 is an area for displaying the image of the input image data of the page being processed.

The information display area 1305 is an area for displaying the item display area 1306, the partial image display area 1307, and the character information display area 1308. The details of each area are to be described later together with the explanation of steps of the flowchart.

In S1202, the input receiving unit 519 determines whether any one of the items displayed in the item display area 1306 is specified by the user. In the item display area 1306, each item of the item list 803 inserted into the page description data is displayed. In the present embodiment, since the UI screen 1301 is displayed on the touch panel screen 301, the user can specify an item of the item list 803 by pressing any one of the items on the touch panel screen 301.

In a case where it is determined that no item is pressed (NO in S1202), the processing proceeds to S1203. In S1203, the input receiving unit 519 determines whether the processing end button 1303 is pressed by the user, so as to provide an instruction for an end of the processing. In a case where it is determined in S1203 that the processing end button 1303 is not pressed, the processing returns to S1202, so as to wait for input from the user. In a case where it is determined in S1203 that the processing end button 1303 is pressed, the application executing process for the page currently being processed ends.

Figure 13B:
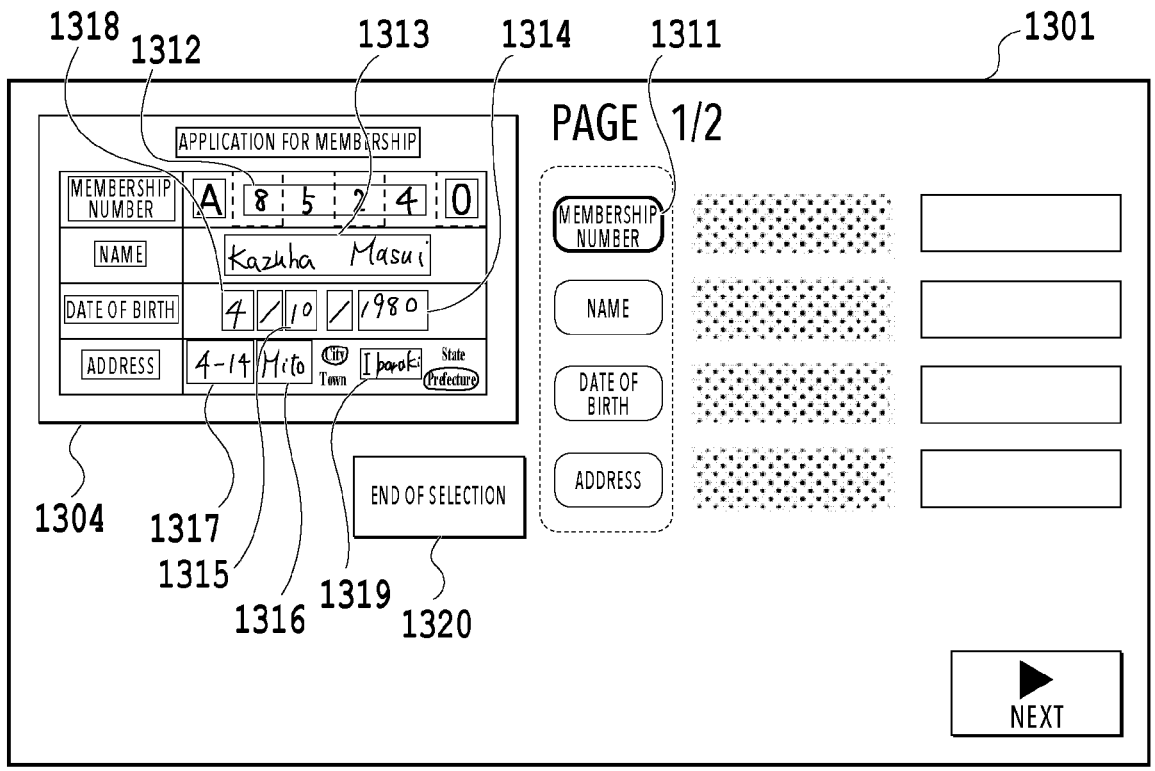

In a case where it is determined that any one of the items displayed in the item display area 1306 is pressed (YES in S1202), the UI display unit 511 updates the display of the UI screen 1301 in S1204. FIG. 13B is an example of a UI screen displayed by the UI display unit 511 as a result of the process of S1204. FIG. 13B is an example of the UI screen in a case where the item 1311, which represents "MEMBERSHIP NUMBER", is specified, in which the UI display unit 511 highlights and displays the item 1311, so that it is indicated that the specified item name "MEMBERSHIP NUMBER" is being selected.

Furthermore, in the present step, the character information area display selecting unit 517 obtains the coordinates and sizes of records of which the classification 1105 is "HANDWRITTEN CHARACTER" from the character information extraction result 1101. That is, the character information area display selecting unit 517 obtains information of the positions and sizes representing a handwritten character area. The character information area display unit 514 displays the image display area 1304 on which rectangular frames are superimposed as the handwritten character areas, based on the positions and information obtained by the character information area display selecting unit 517. FIG. 13B is a diagram illustrating the UI screen 1301 displaying the image display area 1304 on which the rectangular frames representing the handwritten character areas 1312 through 1310, which are character information areas that are classified into handwritten characters, are superimposed. Although rectangular frames are superimposed in order to highlight character information areas in the present embodiment, it is also possible to highlight character information areas by another method such as changing the font color.

Moreover, the UI display unit 511 displays a selection end button 1320 that receives the end of selection of the area corresponding to the item 1311.

Note that, as for the process of S1204, it is also possible that a rectangular frame is superimposed and displayed for a character information area other than handwritten characters, so that the user can specify a character information area other than "HANDWRITTEN CHARACTER".

In S1205, the input receiving unit 519 determines whether any one of the handwritten character areas 1312 through 1319, for which superimposition was performed in S1204, is specified by the user. For example, the input receiving unit 519 determines whether any one of the handwritten character areas 1312 through 1319 on the touch panel is pressed and specified by the user.

Figures 13C, 13D:
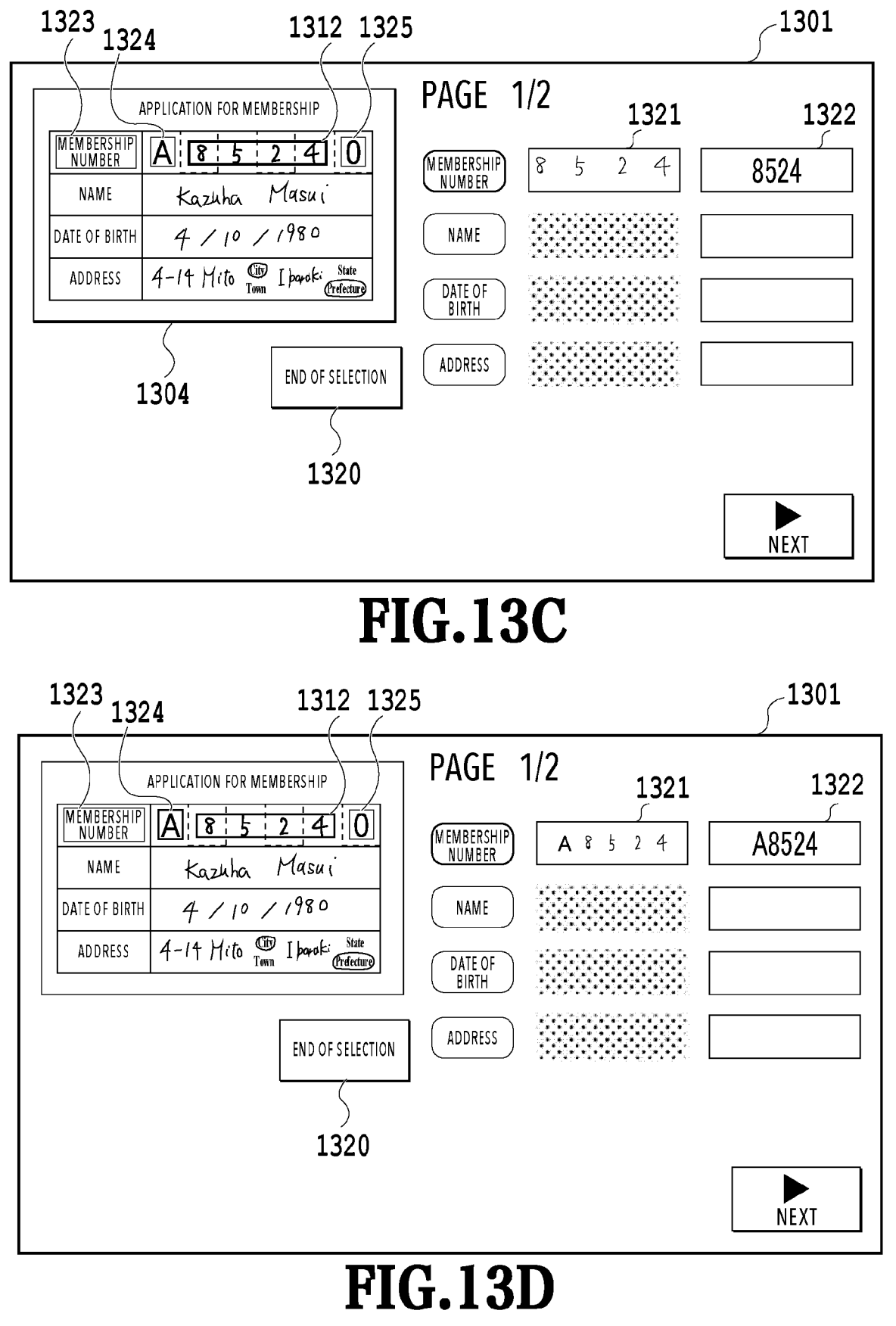

In a case where it is determined that none of the handwritten character areas is specified (NO in S1205), the input receiving unit 519 determines in S1209 whether the selection end button 1320 is pressed. In a case where it is determined in S1209 that the selection end button 1320 is not pressed, the processing returns to S1205, so as to wait for input from the user. In a case where it is determined in S1209 that the selection end button is pressed, the processing is to end without selecting any of the handwritten character areas 1312 through 1319. Therefore, in S1210, the UI display unit 511 switches the highlight display of the item 1311, with which it is indicated that the item 1311 is being selected, to the normal display, and deletes the rectangular frames, which represent the handwritten character areas displayed on the image display area 1304, from the screen. As a result of the process in S1210, the UI screen 1301 on the touch panel returns to the screen of FIG. 13A. Thereafter, the processing returns to S1202, so as to wait for input from the user In a case where it is determined that any one of the handwritten character areas is specified (YES in S1205), the partial image display unit 515 displays a partial image 1321 of the specified handwritten character area on the partial image display area 1307 corresponding to the item 1311, which is being selected, in S1206. FIG. 13C is a diagram illustrating a UI screen in a case where the handwritten character area 1312 is pressed and specified by the user.

A specific explanation is given of the process of S1206. It is assumed that the handwritten character area 1312 is pressed and specified by the user in the status of FIG. 13B. It is assumed that the record (row) representing the handwritten character area 1312 in the character information extraction result 1101 is the record of which the number 1102 is "9". In this case, the partial image display unit 515 obtains the values held in the coordinates 1103 and the size 1104 of the record whose number is "9". The partial image display unit 515 cuts out the corresponding part from the image data of the input image as the partial image, based on the obtained coordinates and size, and displays the partial image 1321 in the partial image display area 1307 of the item 1311, which is specified by the user.

In S1207, the UI display unit 511 displays the character information of the handwritten character area specified by the user in the character information display area 1308. For example, in a case where the handwritten character area 1312 is specified by the user, the record (row) representing the handwritten character area 1312 in the character information extraction result 1101 is the record of which the number 1102 is "9". Therefore, the UI display unit 511 obtains "8254", which is held in the OCR result 1106 of that record, and displays "8524" in the character information display area 1322.

In S1208, the character information area display selecting unit 517 selects character information areas of the character information that are likely to be combined with the character information represented by the handwritten character area specified by the user, based on the character information extraction result 1101. The character information areas that are likely to be combined are referred to as combination candidate areas. Since the form to be the processing target in the present embodiment is horizontal writing, the character information area display selecting unit 517 selects, from among all character information areas, character information areas of which the coordinates of the height direction are within a predetermined range from the handwritten character area specified by the user.

For example, it is assumed that the handwritten character area specified by the user is the handwritten character area 1312. The handwritten character area 1312 corresponds to the record of which the number 1102 in the character information extraction result 1101 is "9", and "465" is held as the coordinate of the position in the height direction. For example, the herein-described "within a predetermined range" is to have a value of 1.1 to 0.9 times greater.

Accordingly, the character information area display selecting unit 517 selects the records of which the coordinates within the range of 1.1 to 0.9 times greater than "465" 0 are held as the coordinates 1103 of the height, direction in the character information extraction result 1101. That is, of the character information extraction result 1101, the records of which "492", "429", and "432" are held as the coordinates 1103 of the height direction, respectively, are selected. The record numbers 1102 corresponding to these coordinates are "1", "2", and "3", respectively. Therefore, the character information area display selecting unit 517 selects the coordinates 1103 and size 1104 of each record of which the number 1102 is "1", "2", or "3". Then, the character information area display unit 514 displays the image display area 1304 on which rectangular frames are superimposed as combination candidate areas 1323 through 1325, which correspond to the selected character information areas, so that it is possible for the user to specify the combination candidate areas 1323 through 1325.

Furthermore, the character information area display unit 514 deletes the rectangular frames of the handwritten character areas 1313 through 1319 other than the handwritten character area 1312 specified by the user, so that it is not possible for the user to specify the handwritten character areas 1313 through 1319. FIG. 13C is a diagram illustrating the UI screen 1301 on which the combination candidate areas 1323 through 1325 are superimposed and displayed as the rectangular frames.

In S1211, the input receiving unit 519 determines whether any one of the combination candidate areas 1323 through 1325, which are selected in S1208, is specified by the user. That is, whether any one of the combination candidate areas displayed on the touch panel screen 301 is pressed and specified by the user is determined. In a case where any one of the combination candidate areas is specified, the processing proceeds to S1212.

In S1212, the character information combining unit 518 obtains the character information of the OCR result 1106 corresponding to the combination candidate area specified by the user and combines the character information with that character information of the handwritten character area specified by the user.

FIG. 13D is a diagram illustrating the UI screen 1301 in a case where the combination candidate area 1324 is specified by the user. In FIG. 13D, the combination candidate area 1324, which is on the left of the handwritten character area 1312 that is specified by the user, is specified by the user. Therefore, "A", which is the OCR result 1106 of the combination candidate area 1324, is combined to the left of "8524", which is the OCR result 1106 of the handwritten character area 1312. The character information display unit 516 displays the combined results in the character information display area 1322.

In S1213, the partial image display unit 515 displays the partial image 1321, which is obtained by combining the combination candidate area 1324 and the handwritten character area 1312. Upon completion of the process of S1213, the processing returns to S1211, so as to wait for the user to specify another combination candidate area.

Figures 13E, 13F:
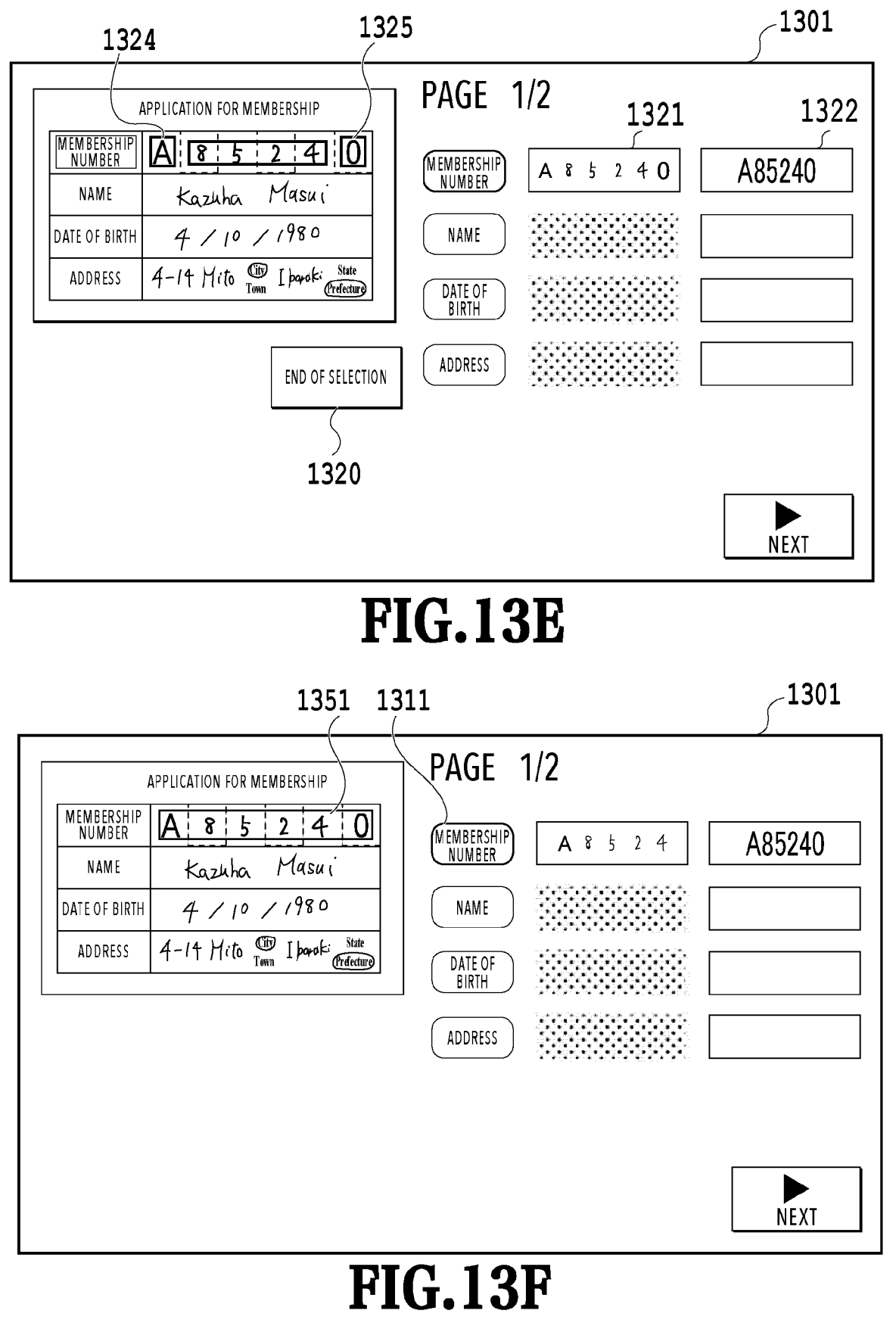

FIG. 13E is a diagram illustrating the UI screen 1301 in a case where the combination candidate area 1325 is further specified by the user in the status of FIG. 13D. This newly specified combination candidate area 1325 is on the right of the handwritten character area 1312 that is specified by the user. Therefore, "0", which is the OCR result 1106 of the combination candidate area 1325, is combined to the right of "8524", which is the OCR result 1106 of the handwritten character area 1312, by the character information combining unit 518. The character information display unit 516 displays the combined character information in the character information display area 1322, and the partial image display unit 515 displays the partial image 1321, which represents three areas.

In a case where it is determined in S1211 that no combination candidate area is pressed, the processing proceeds to S1214. In S1214, the input receiving unit 519 determines whether the selection end button 1320 is pressed. In a case where it is determined that the selection end button 1320 is not pressed, the processing returns to S1211, so as to wait for input from the user. In a case where it is determined in S1214 that the selection end button 1320 is pressed, the processing proceeds to S1215.

In S1215, the UI display unit 511 updates the screen display. FIG. 13F is a diagram illustrating the UI screen displayed as a result of the process of S1215. The character information area display unit 514 displays a rectangular frame for the area 1351, which includes the character information areas (the handwritten character area and the combination candidate areas) specified by the user through the above-described steps, and deletes the frames displayed for the unspecified areas. Furthermore, the item display unit 513 switches the highlight display of the item 1311, with which it is indicated that the item 1311 is being selected, to the normal display. Upon completion of the update of display of the screen in S1215, the processing returns to S1202, so as to wait for the user to press an item name displayed in the item display area 1306.

Figure 13G:

The processes of S1202 to S1215 are repeated for all the items displayed in the item display area 1306. Upon completion of the processes for all the items, the area 1351, the area 1352, the area 1353, and the area 1354 are displayed with the rectangular frames as illustrated in FIG. 13G, and the character information of the respective areas are displayed in the character information display area 1308. In this status, in a case where the input receiving unit 519 detects that the processing end button 1303 is pressed in S1203, the processing for the processing target page is ended.

Upon completion of the processing of FIG. 12 for all pages of the image data read, by the image reading unit 501, the combined and extracted character information is converted to data in S706. The herein-described data is as illustrated in FIG. 14. The data format is CSV, and the data is segmented by commas. The row 1401 corresponds to the items displayed in the item display area 1306, and the row 1402 corresponds to the data displayed in the character information display area 1308. The process of extracting character information front image data is completed by sending the data of FIG. 14 to a predetermined device that is specified by the user, such as the PC 103, via the network 106.

As explained above, according to the present embodiment, it is possible to combine character information obtained from each of a character information area of a handwritten character and a character information area of a printed character. Therefore, for example, even in a case where character information in association with an item is extracted from a result of OCR processes performed to a document including both, a handwritten character and a printed character, it is possible to obtain character information properly being in association with an item.

Furthermore, in the present embodiment, it is possible to display character information areas that are likely to be combined with the character information area of the handwritten character selected by the user in such a manner that the user can specify the character information areas. Since a form includes so many printed characters such as item names and explanatory sentences, there is a case in which the user cannot easily specify character information areas to be combined. However, according to the present embodiment, it is possible for the user to easily specify character information areas to be combined, and therefor the operability is improved.

Modification Example 1

In the above-described explanation, as for the method for selecting combination candidate areas, character information areas that are not the handwritten character area 1312 specified by the user and are positioned near the handwritten character area 1312 the height direction. Alternatively, it is also possible that, as combination candidate areas, the character information area display selecting unit 517 selects only character information areas adjacent to the handwritten character area 1312 specified by the user.

Figure 15A:
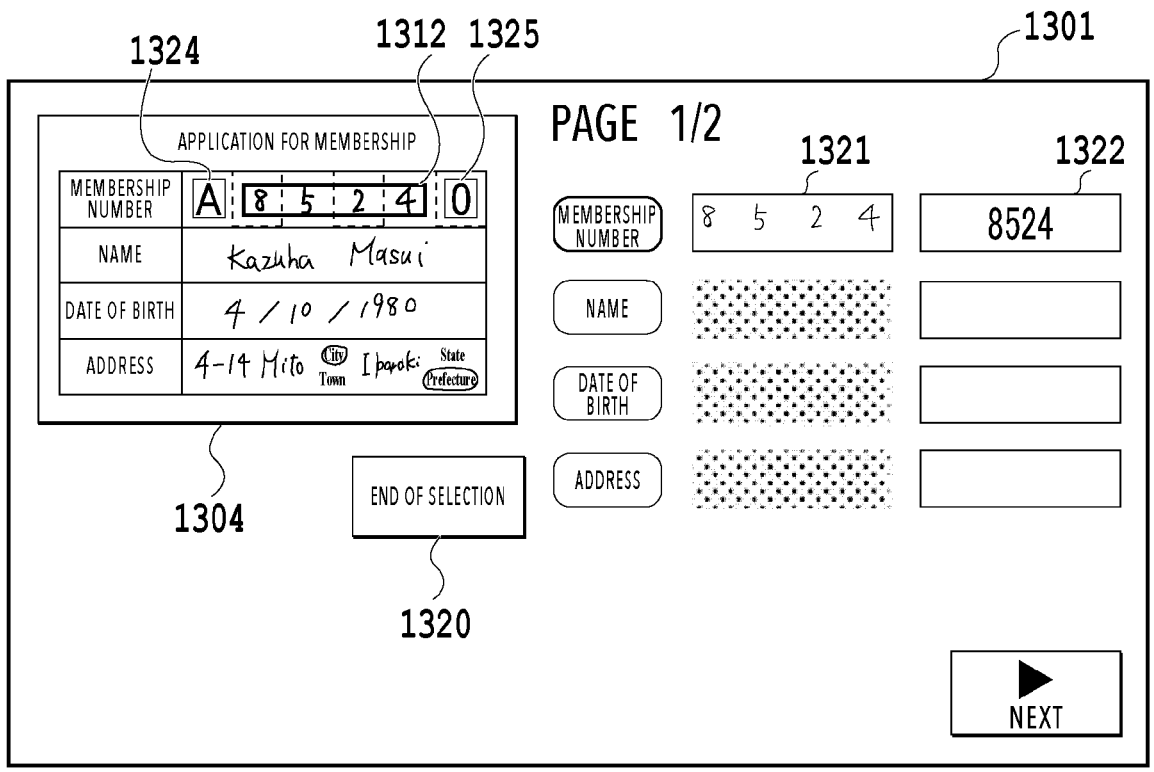

FIG. 15A is a diagram illustrating the UI screen 1301 on which combination candidate areas are displayed in the present example. As illustrated in FIG. 15A, as combination candidate areas, the character information area display selecting unit 517 selects only the character information area 1324 and the character information area 1325, which are adjacent to the handwritten character area 1312 specified by the user, in S1208. Then, the character information area display unit 514 displays the image display area 1304 on which the rectangular frames representing the character information area 1324 and the character information area 1325, which are selected as the combination candidate areas, are superimposed, so that it is possible for the user to select the character information area 1324 and the character information area 1325.

Furthermore, in a case where any one of the combination candidate areas is specified by the user in the status of FIG. 15A the character information area display selecting unit 517 selects character information areas that are adjacent to the combination candidate area specified by the user as new combination candidate areas. Then, the character information area display unit 514 displays the image display area 1304 on which the rectangular frames representing the newly selected combination candidate areas are superimposed, so that it is possible for the user to select the newly selected combination candidate areas.

Figure 15B:
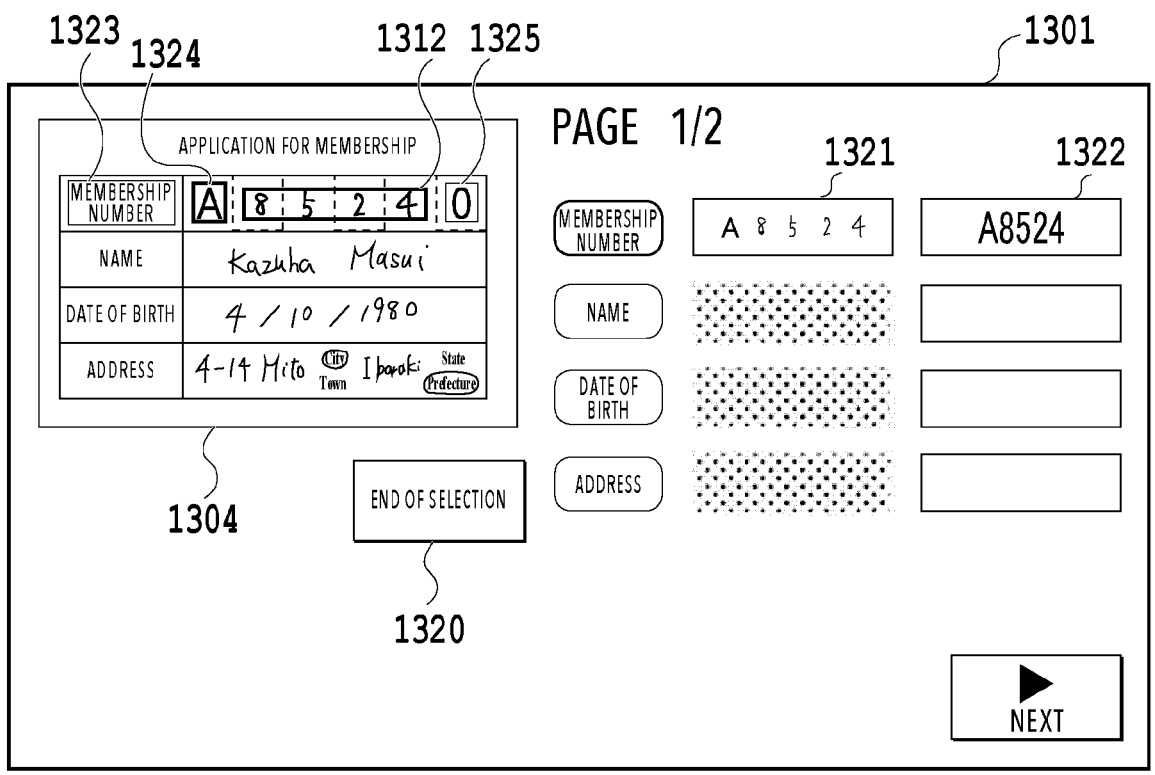

For example, it is assumed that the combination candidate area 1324 is specified by the user in the status of FIG. 15A. In that case, as illustrated in FIG. 15B, the character information area 1323, which is adjacent to the combination candidate area 1324, is newly selected as a combination candidate area and displayed with a rectangular frame.

As described above, according to the present example, since a character information area adjacent to a selected combination candidate area is sequentially selected as a combination candidate area, it is possible to combine character information divided in to multiple areas. Furthermore, according to the present example, since only adjacent character information areas are displayed as combination candidate areas, it is possible for the user to easily recognize the combination candidate areas that can be specified. Therefore, according to the present example, it is possible to improve the convenience for the user.

Modification Example 2

As for the method for selecting combination candidate areas, it is also possible that combination candidate areas are selected based on the processing target item and the character information held in the OCR results 1106.

For example, a character string is stored in advance in relation to an item of the item list 803. Then, it is assumed that, in the status of the UI screen 1301 of FIG. 13A, the user specifies "DATE OF BIRTH" from among the items in the item display area 1306. Then, in S1208, the character information area display selecting unit 517 searches the character information held in the OCR results 1106 for the character string related to the item "DATE OF BIRTH", so as to select a character information area including the character information as a combination candidate area.

As for the character string related to an item name, for example, in a case where the item name is "DATE OF BIRTH", a character information area including a character related to a date is searched. Here, the character related to a date is, for example, a symbol "/". In addition, in a case where the item name is "ADDRESS", a character information area including a character related to an address, such as a State, a prefecture, a municipality, etc., is searched.

Figures 15C, 15D:
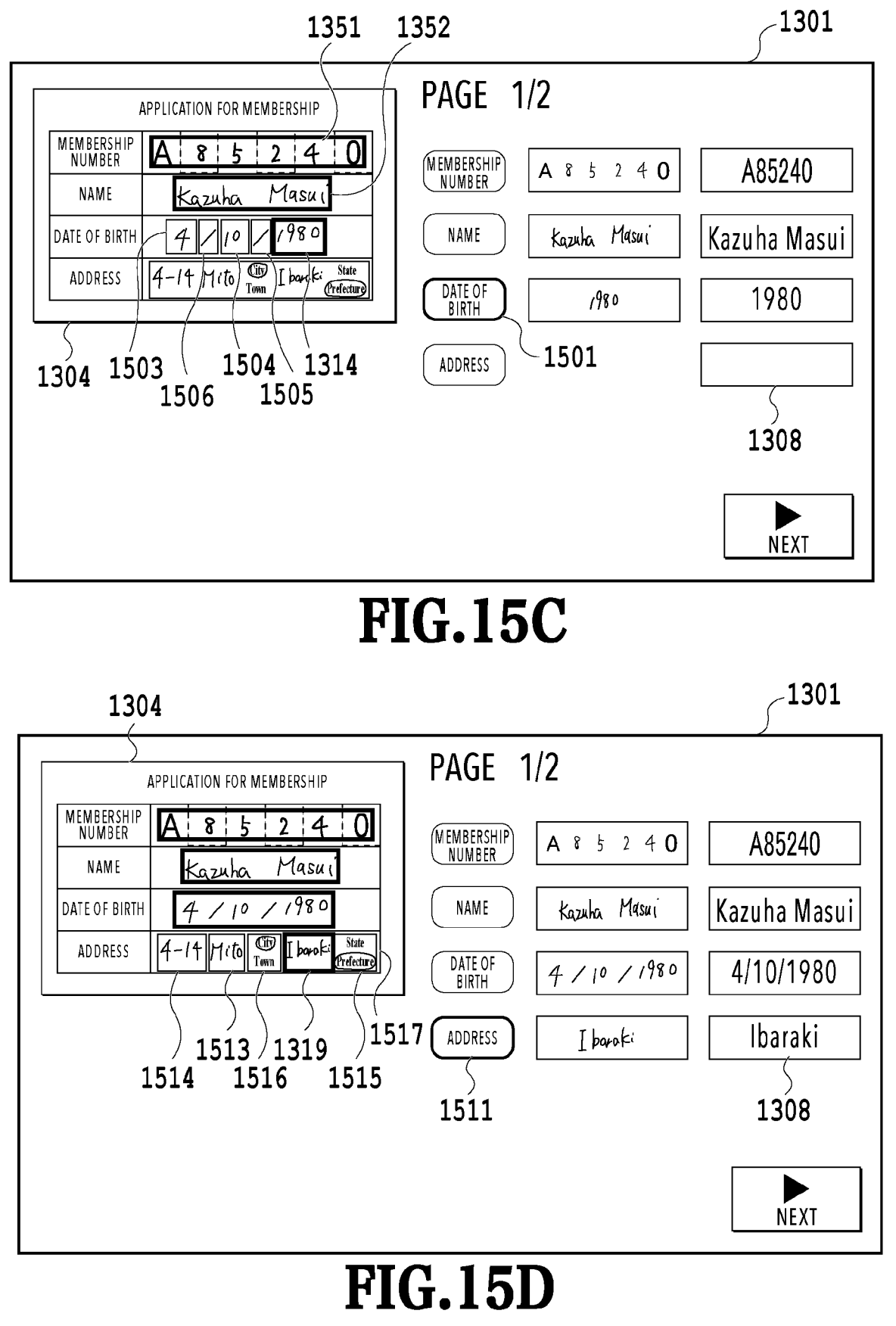

FIG. 15C is a diagram illustrating the UI screen 1301 on which combination candidate areas are superimposed and displayed in a case where the processing target item 1501 is "DATE OF BIRTH" and the handwritten character area 1314 is specified by the user. As illustrated in FIG. 15C, the character information areas 1503 and 1504, which include numbers, and the character information areas 1505 and 1506, which include character information of "/", are selected as the combination candidate areas. Furthermore, the character information area display unit 514 superimposes and displays these character information areas on the image display area 1304 as rectangular frames, so that the user can specify the character information areas. Moreover, as combination candidate areas, it is also possible to select character information areas that are not the handwritten character area 1314 specified by the user and are positioned near the handwritten character area 1314 in the height direction. In this case, for example, although numbers are also described in the description field of the address in FIG. 15C, it is possible to prevent the numbers from being selected as combination candidate areas.

Note that, instead of displaying character information areas related to an item as combination candidate areas, it is also possible that the character information combining unit 518 combines the handwritten character area specified by the user and the character information of combination candidate areas, so as to generate character information indicative of "Apr. 10,1980". Then, it is also possible to display that result in the character information display area 1308.

As explained above, since character information areas that are highly likely to be combined are selected as combination candidate areas in the present example, it is possible for the user to easily recognize the combination candidate areas that can be specified. Therefore, according to the present example, it is possible to improve the convenience for the user.

Modification Example 3

As for the method for selecting combination candidate areas, it is also possible to use a method in which, based on a table structure recognized in an input image 801, character information areas inside the same cell (inside, a rectangular frame) of the table structure are selected as combination candidate areas.

The character information area display selecting unit 517 detects straight lines included in the input image 801 and detects a rectangle included in the input image 801, based on intersection points of the detected straight lines. The character information area display selecting, unit 517 recognizes a table structure as a group of detected rectangles. Then, the character information area display selecting unit 517 detects a rectangular frame including the handwritten character area specified by the user from among the rectangular frames configuring the table structure, so as to select the character information areas included in the rectangular frame as combination candidate areas.

FIG. 15D is a diagram illustrating the UI screen 1301 after the table structure is recognized. In FIG. 15D, the item 1511 representing "ADDRESS" is specified by the user, and the handwritten character area 1319 is specified by the user. In this case, the character information area display selecting unit 517 detects a rectangular frame including the handwritten character area 1319. In FIG. 15D, the rectangular frame 1517 is detected as the rectangular frame including the handwritten character area 1319. Therefore, the character information areas 1513 through 1516 included in the rectangular frame 1517 are selected as the combination candidate areas.

Therefore, the character information area display unit 514 superimposes and displays the frames representing the character information areas 1513 through 1516 on the image display area 1304, so that the user can specify the character information areas 1513 through 1516.

Note that, instead of displaying character information areas inside the rectangular frame 1517 as combination candidate areas, it is also possible that the character information combining unit 518 combines the handwritten character area specified by the user and the character information of the combination candidate areas, so as to generate character information indicative of "4-14 Mito City Ibaraki Prefecture". Then, it is also possible to display that result in the character information display area 1308.

As explained above, also in the present example, the user can easily recognize the combination candidate areas to be the selection targets that can be specified. Therefore, according to the present example, it is possible to improve the convenience for the user.

Other Embodiments

Although the image processing server 105 performs the character recognition process (OCR process) in the above-described embodiment, it is also possible that the image forming apparatus 101 having the function of the character information extracting unit 622 performs the character recognition process.

According to the technique of the present disclosure, it is possible to obtain appropriate character information from a result of an OCR process.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiments), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiments). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-164605, filed Sep. 10, 2019, which is hereby incorporated by reference wherein in its entirety.

What is claimed is:

1. An image processing apparatus comprising:
an obtaining unit configured to obtain information that has been obtained by performing an OCR (Optical Character Recognition) process on image data obtained by reading a document including at least one handwritten character string and at least one printed character string;
a display control unit configured to highlight and display at least one character information area including a handwritten character string out of character information areas including character information in an image represented by the image data;
a receiving unit configured to receive a character information area including a handwritten character string specified by a user out of the at least one character information area including the handwritten character strings;
a selecting unit configured to select at least one combination candidate area, the combination candidate area being a character information area other than the character information area including the handwritten character string specified by the user and to be combined with the character information area including the handwritten character string specified b the user; and a combining unit configured to combine character information in the character information area including the handwritten character string specified by the user and character information in the combination candidate area.

2. The image processing apparatus according to claim 1, wherein the combining unit combines the character information in the character information area including the handwritten character string specified by the user and character information in a combination candidate area specified by the user out of the at least one combination candidate area.

3. The image processing, apparatus according to claim 1, wherein, as the at least one combination candidate area, the selecting unit selects a character information area from which a position in a height direction of the character information area including the handwritten character string specified by the user in the image represented by the image data is within a predetermined range.

4. The image processing apparatus according to claim 1, wherein, as the at least one combination candidate area, the selecting unit selects a character information area adjacent to the character information area including the handwritten character string specified by the user.

5. The image processing apparatus according to claim 4, wherein, in a case here any of the at least one combination candidate area is specified by the user, the selecting unit further selects a character information area adjacent to the combination candidate area specified by the user as the at least one combination candidate area.

6. The image processing apparatus according to claim 1, wherein the selecting unit detects a table structure, which is indicated as a group of rectangles and is included in the image represented by the image data, and wherein, in a case where the character information area including the handwritten character string specified by the user is inside a frame formed by any of the rectangles configuring the table structure, the selecting unit selects another character information area inside the frame as the at least one combination candidate area.

7. The image processing apparatus according to claim 1, wherein, in a case of selecting the at least one combination candidate area in relation to an item specified b the user, the selecting unit selects a character information area including character information related to the item as the at least one combination candidate area.

8. The image processing apparatus according to claim 1, wherein the combining unit performs the combining for each item specified by the user, and wherein character information obtained by the combining of character information, which is performed by the combining unit, is associated with the item and sent to an apparatus specified by the user.

9. The image processing apparatus according to claim 1, wherein the display control unit controls a display unit to display the image represented by the image data such that an area that can be specified by the user is highlighted.

10. The image processing apparatus according to claim 1, wherein the display control unit controls a display unit to display the image represented by the image data such that the at least one combination candidate area is highlighted.

11. The image processing apparatus according to claim 1, wherein, in a case where character information is combined by the combining unit the display control unit displays combined character information.

12. The image processing apparatus according to claim 1, wherein the obtaining unit obtains information including positional information of the character information areas, character information included in the character information areas, and information indicating whether each of the character information areas is a character information area including a handwritten character string.

13. An image processing system including an image processing apparatus and an image processing server, the image processing apparatus comprising:
an obtaining unit configured to obtain information that has been obtained by performing an OCR (Optical Character Recognition) process on image data obtained by reading a document including at least one handwritten character string and at least one printed character string;

a display control unit configured to highlight and display at least one Character information area including a handwritten character string out of character information areas including character information in an image represented by the image data;

a receiving unit configured to receive a character information area including a handwritten character string specified by a user out of the at least one character information area including the handwritten character string;

a selecting unit configured to select at least one combination candidate area, the combination candidate area being a character information area other than the character information area including the handwritten character string specified by the user and to be combined with the character information area including the handwritten character siting specified by the user; and a combining unit configured to combine character information in the character information area including the handwritten character string specified by the user and character information in the combination candidate area, the image processing server comprising:
an image data obtaining unit configured to obtain unfilled image data and filled image data, the unfilled image data being image data of a first document that does not include a handwritten character string, the filled image data being obtained by reading a second document that is the first document to which handwriting is added;

a generating unit configured to generate image data of a difference image by obtaining a difference of pixel values of the unfilled image data and the filled image data;

an extracting unit configured to extract a character information area, which is an area including character information, from each of the difference image and an image represented by the unfilled image data;

a classifying unit configured to classify the character information area extracted from the difference image into a classification representing the handwritten character string;

a character recognizing unit configured to recognize the character information included in the character information area; and a managing unit configured to manage positional information of the character information area, the character information recognized from the character information area, and information indicating whether the character information areas is a character information area including a handwritten character string, in association with each other.

14. The image processing system according to claim 13, wherein the image processing server performs management by use of a table storing the positional information of the character information area, the character information recognized from the character information area, and the information indicating whether the character information area is a character information area including a handwritten character string, in association with each other.

15. The image processing system according to claim 14, wherein the obtaining unit of the image processing apparatus obtains the table from the image processing server.

16. An image processing method comprising:

obtaining information that has been obtained by performing an OCR (Optical Character Recognition) process on image data obtained by reading a document including at least one handwritten character string and at least one printed character string;

highlighting and displaying at least one character information area including a handwritten character sitting out of character information areas including character information in an image represented by the image data;

receiving a character information area including a handwritten character string specified by a user out of the at least one character information area including the handwritten character string;

selecting at least one combination candidate area, the combination candidate area being a character information area other than the character information area including the handwritten character string specified by the user and to be combined with the character information area including the handwritten character string specified by the user; and combining character information in the character information area including the handwritten character string specified by the user and character information in the combination candidate area.

17. A non-transitory computer readable storage medium storing a program which causes a computer to perform an image processing method, the image processing method comprising obtaining information that has been obtained by performing an OCR (Optical Character Recognition) process on image data obtained by reading a document including at least one handwritten character string and at least one printed character string;

highlighting and displaying at least one character information area including, a handwritten character string out of character information areas including character information in an image represented by the image data;

receiving a character information area including a handwritten character string specified by a user out of the at least one character information area including the handwritten character string;

selecting at least one combination candidate area, the combination candidate area being a character information area other than the character information area including the handwritten character string specified by the user and to be combined with the character information area including the handwritten character string specified by the user; and combining character information in the character information area including the handwritten character string specified by the user and character information in the combination candidate area.

\* \* \* \* \*